US011416506B2

(12) United States Patent
de Abreu Pinho et al.

(10) Patent No.: US 11,416,506 B2
(45) Date of Patent: Aug. 16, 2022

(54) FACILITATING TEMPORAL DATA MANAGEMENT FOR ANOMALOUS STATE DETECTION IN DATA CENTERS

(71) Applicant: EMC IP Holding Company LLC, Hopkinton, MA (US)

(72) Inventors: Rômulo Teixeira de Abreu Pinho, Niteroi (BR); Vítor Silva Sousa, Niteroi (BR); Rodrigo Rios Almeida de Souza, Rio de Janeiro (BR); Roberto Nery Stelling Neto, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 16/861,982

(22) Filed: Apr. 29, 2020

(65) Prior Publication Data

US 2021/0342347 A1    Nov. 4, 2021

(51) Int. Cl.
| | |
|---|---|
| *G06F 16/2458* | (2019.01) |
| *G06F 16/215* | (2019.01) |
| *G06F 16/25* | (2019.01) |
| *G06F 16/23* | (2019.01) |

(52) U.S. Cl.
CPC ........ *G06F 16/2474* (2019.01); *G06F 16/215* (2019.01); *G06F 16/2379* (2019.01); *G06F 16/258* (2019.01)

(58) Field of Classification Search
USPC ........................................................ 707/692
See application file for complete search history.

(56) References Cited

U.S. PATENT DOCUMENTS

| | | | |
|---|---|---|---|
| 10,444,032 B2 | 10/2019 | Takahashi | |
| 10,467,067 B2 | 11/2019 | Patton et al. | |
| 10,630,561 B1 | 4/2020 | Tao et al. | |
| 10,956,808 B1 * | 3/2021 | Bhardwaj | G06N 3/0472 |
| 10,997,009 B2 | 5/2021 | Poghosyan et al. | |

(Continued)

OTHER PUBLICATIONS

Aggarwal et al., "Outlier Analysis," Springer, 2017.

(Continued)

*Primary Examiner* — Cam Linh T Nguyen
(74) *Attorney, Agent, or Firm* — Amin, Turocy & Watson, LLP

(57) ABSTRACT

Facilitating temporal data management for anomalous state detection in data centers is provided herein. A system can comprise a processor and a memory that stores executable instructions that, when executed by the processor, facilitate performance of operations. The operations can comprise performing a process of extraction, transformation, and loading of data from log files into a telemetry data store. The data can be loaded into the telemetry data store as telemetry data. The operations also can comprise dividing the telemetry data into first telemetry data and second telemetry data. The first telemetry data can comprise telemetry data that does not satisfy a defined quality level. The second telemetry data can comprise telemetry data that satisfies the defined quality level. Further, the operations can comprise removing the first telemetry data from the telemetry data store and outputting the second telemetry data based on a request for the second telemetry data.

20 Claims, 15 Drawing Sheets

(56) References Cited

U.S. PATENT DOCUMENTS

| | | | |
|---|---|---|---|
| 2010/0241615 A1* | 9/2010 | Marshall | G06Q 10/10 |
| | | | 707/661 |
| 2012/0059779 A1 | 3/2012 | Syed et al. | |
| 2012/0226823 A1* | 9/2012 | Livnat | G06F 21/62 |
| | | | 709/246 |
| 2017/0102693 A1* | 4/2017 | Kidd | G05B 19/41875 |
| 2017/0102694 A1* | 4/2017 | Enver | G05B 19/4184 |
| 2017/0102696 A1* | 4/2017 | Bell | G05B 23/024 |
| 2019/0133536 A1* | 5/2019 | Roberts | A61B 5/7275 |
| 2019/0147670 A1* | 5/2019 | Chopra | H04L 65/60 |
| | | | 701/29.1 |
| 2019/0149440 A1* | 5/2019 | Rantzau | H04L 63/1425 |
| | | | 370/241 |
| 2019/0205232 A1* | 7/2019 | Ayyagari | G06F 11/2205 |
| 2019/0213198 A1 | 7/2019 | Kannan et al. | |
| 2019/0243739 A1 | 8/2019 | Song et al. | |
| 2019/0294642 A1 | 9/2019 | Matlick et al. | |
| 2021/0034949 A1* | 2/2021 | Singh | G06N 3/0445 |
| 2021/0150261 A1 | 5/2021 | Zhang et al. | |
| 2021/0208995 A1 | 7/2021 | de Abreu Pinho et al. | |

OTHER PUBLICATIONS

Aggarwal et al., "Data Clustering: Algorithms and Applications," Chapman \& Hall/CRC, 2013.
Bagnall et al., "The great time series classification bake off: a review and experimental evaluation of recent algorithmic advances," Data Min Knowl Disc, vol. 31, pp. 606-660, 2017.
Schütze et al., Foundations of Statistical Natural Language Processing, Cambridge, Mass: MIT Press, 2006.
Allison, "Missing Data", SAGE Publications, 2001. 97 pages.
Non-Final Office Action received for U.S. Appl. No. 16/734,838 dated Sep. 16, 2021, 26 pages.

* cited by examiner

FACILITATING TEMPORAL DATA MANAGEMENT FOR ANOMALOUS STATE DETECTION IN DATA CENTERS

TECHNICAL FIELD

The subject disclosure relates generally to data storage systems and communications. More specifically, the subject disclosure relates to configuring data for anomaly detection of data storage systems.

BACKGROUND

Advances in data center system elements have provided various forms of temporal data collection mechanisms. Different types of data collection are delivered by these data collection mechanisms. Anomalous behaviors in system components reported by end users (e.g., customers) or by Simple Network Management Protocol (SNMP) based monitoring systems should be addressed. Anomaly detection in data centers requires several data processing steps to access, parse, tokenize, assess, filter, aggregate, and merge telemetry data prior to the generation of actionable insights. Accordingly, it can be difficult, if not impossible, to properly perform anomaly detection in data centers.

The above-described context with respect to conventional anomaly detection systems is merely intended to provide an overview of current technology and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a method that can comprise instantiating, by a system comprising a processor, cartridges selected from a group of cartridges based on a defined file format of raw data received from log files associated with a defined entity. The cartridges can define respective conversion processes for the raw data. According to some implementations, the group of cartridges can be a composable architecture of data management services. The method also can comprise converting, by the system, the raw data into data representative of a time series. The data can comprise respective values of defined variables. The defined variables can characterize elements of the defined entity. The method also can comprise determining, by the system, that a first set of variables of the defined variables satisfy a defined quality level. Further, the method can comprise outputting, by the system, first time series data of the data representative of the time series. The first time series data can be for the first set of variables.

According to some implementations, the method can comprise storing, by the system, the data representative of the time series in a data store. Further to these implementations, the method can comprise determining, by the system, that a second set of variables of the defined variables fail to satisfy the defined quality level. In addition, the method can comprise removing, by the system, from the data store, second time series data of the data representative of the time series. The second time series data can be for the second set of variables.

In some implementations, converting the raw data can comprise instantiating, by the system, cartridges selected from a group of cartridges based on a defined file format of the raw data. The cartridges can define respective conversion processes for the raw data. Further to these implementations, the method can comprise differentiating, by the system, the defined file format from a group of file formats based on respective variable types of the raw data. Alternatively, or additionally, the method can comprise differentiating, by the system, the defined file format from a group of file formats based on respective granularities of telemetry data associated with the time series.

In accordance with some implementations, converting the raw data can comprise normalizing the raw data into a common data format. The raw data can be received from different elements of the defined entity.

According to some implementations, the method can comprise identifying, by the system, second raw data in the log files associated with the defined entity. The second raw data can comprise second respective values of component-based variables associated with a group of data center components of the defined entity. Further, the method can comprise generating, by the system, features based on the second respective values of component-based variables and outputting, by the system, the features as a uniform representation of the features.

Further to the above implementations, generating the features can comprise determining, at each time stamp of the second respective values of component-based variables, a mean value across data center components of the group of data center components. Alternatively, or additionally, generating the features can comprise determining, at each time stamp of the second respective values of component-based variables, a standard deviation of values of data center components of the group of data center components. Alternatively, or additionally, generating the features can comprise determining, at each time stamp of the second respective values of component-based variables, a maximum deviation for a mean value of data center components of the group of data center components. Alternatively, or additionally, generating the features can comprise determining, at each time stamp of the second respective values of component-based variables, an entropy of values of data center components of the group of data center components.

In some implementations the method can comprise prior to the determining, identifying a data gap within the data representative of the time series, resulting in identified data. Further, the method can comprise removing the identified data from the data representative of the time series.

Another embodiment relates to a system that can comprise a processor and a memory that stores executable instructions that, when executed by the processor, facilitate performance of operations. The operations can comprise performing a process of extraction, transformation, and loading of data from log files into a telemetry data store. The data can be loaded into the telemetry data store as telemetry data. Performing the process of extraction, transformation, and loading can comprise instantiating cartridges of a group of cartridges. The cartridges can define respective conversion processes for the data. The operations also can comprise dividing the telemetry data into first telemetry data and second telemetry data. The first telemetry data can comprise telemetry data that does not satisfy a defined quality level. The second telemetry data can comprise telemetry data that satisfies the defined quality level. Further, the operations can comprise removing the first telemetry data from the telemetry data store and outputting the second telemetry data based on a request for the second telemetry data.

According to some implementations, the operations can comprise facilitating implementation of a first cartridge selected from a group of cartridges for first data of the telemetry data based on a first file format of the first data. The first cartridge can define a first conversion process for the first data. Further to these implementations, the operations can comprise facilitating implementation of a second cartridge selected from the group of cartridges for second data of the telemetry data based on a second file format of the second data. The second cartridge can define a second conversion process for the second data.

Further to the above implementations, the first cartridge and the second cartridge can be modular cartridges. Alternatively, or additionally, the first cartridge and the second cartridge can be reusable cartridges.

In accordance with some implementations, the operations can comprise determining second data of the log files comprise respective hidden data that represents component-based variables associated with nodes of a defined entity. Further, the operations can comprise generating features based on the component-based variables. The features can be representative of a health of the defined entity. The operations also can comprise outputting the features as a uniform representation.

Another embodiment relates to a machine-readable storage medium, comprising executable instructions that, when executed by a processor, facilitate performance of operations. The operations can comprise obtaining data from a defined entity. The data can be obtained from one or more data center components of the defined entity and can comprise one or more component-based variables. The operations also can comprise instantiating one or more data management services selected from a composable architecture of data management services. Instantiating the one or more data management services can comprise selecting the one or more data management services based on the data. Also, the operations also can comprise extracting feature data from the one or more component-based variables. The feature data can provide indications of conditions of storage nodes of the defined entity. Further, the operations can comprise outputting an aggregate of the feature data in a uniform format.

According to some implementations, the operations can comprise determining a group of functions for the defined entity based on the second respective values of component-based variables. In addition, the operations can comprise obtaining an overview of respective behaviors of similar components of the defined entity based on the group of functions being represented uniformly across functions of the group of functions.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Anomalous behaviors of system components can be a concern. As a result, it would be beneficial if available data could be analyzed over time to detect and prevent these anomalous behaviors. Properly detecting anomalies empowers the generation of an action plan for each state of interest. However, anomaly detection in data centers requires several data processing steps to access, parse, tokenize, assess, filter, aggregate, and merge telemetry data prior to the generation of actionable insights.

The above-noted data processing steps usually handle the input data collections (e.g., telemetry) provided by the data center system elements. This telemetry data can correspond to time series, which can contain measurement values over time. One complicating factor in handling data center telemetry is that data collections could be available in different types and/or could be stored in different file formats. Thus, a first data collection could be a first type and a second data collection could be a second type, different from the first type. In another example, the first data collection could be in a first file format and a second data collection could be in a second file format, different from the first file format. Although discussed with respect to two data collections, the disclosed aspects can be utilized with any number of data collections.

In addition, cluster-based system elements can generate aggregate data (e.g., for the entire cluster) as well as measurements for each of their components (e.g., nodes). For example, the cluster-based system elements can be envisioned as a cluster of computer nodes. There might be telemetry for the entire process (e.g., an aggregate of all the nodes). There can also be telemetry for different nodes of the cluster, wherein one cluster might have fifty nodes, another cluster might have ten nodes, another cluster might have thirty three nodes, and so on.

An additional complication is that, in the real world, telemetry data is not as "clean" as would be considered ideal. For example, gaps in the data and/or the presence of a clock-skew effect that generates a lack of synchronicity between components of the same data center system element could render the data useless if no processing is performed over the data.

Figure 1:
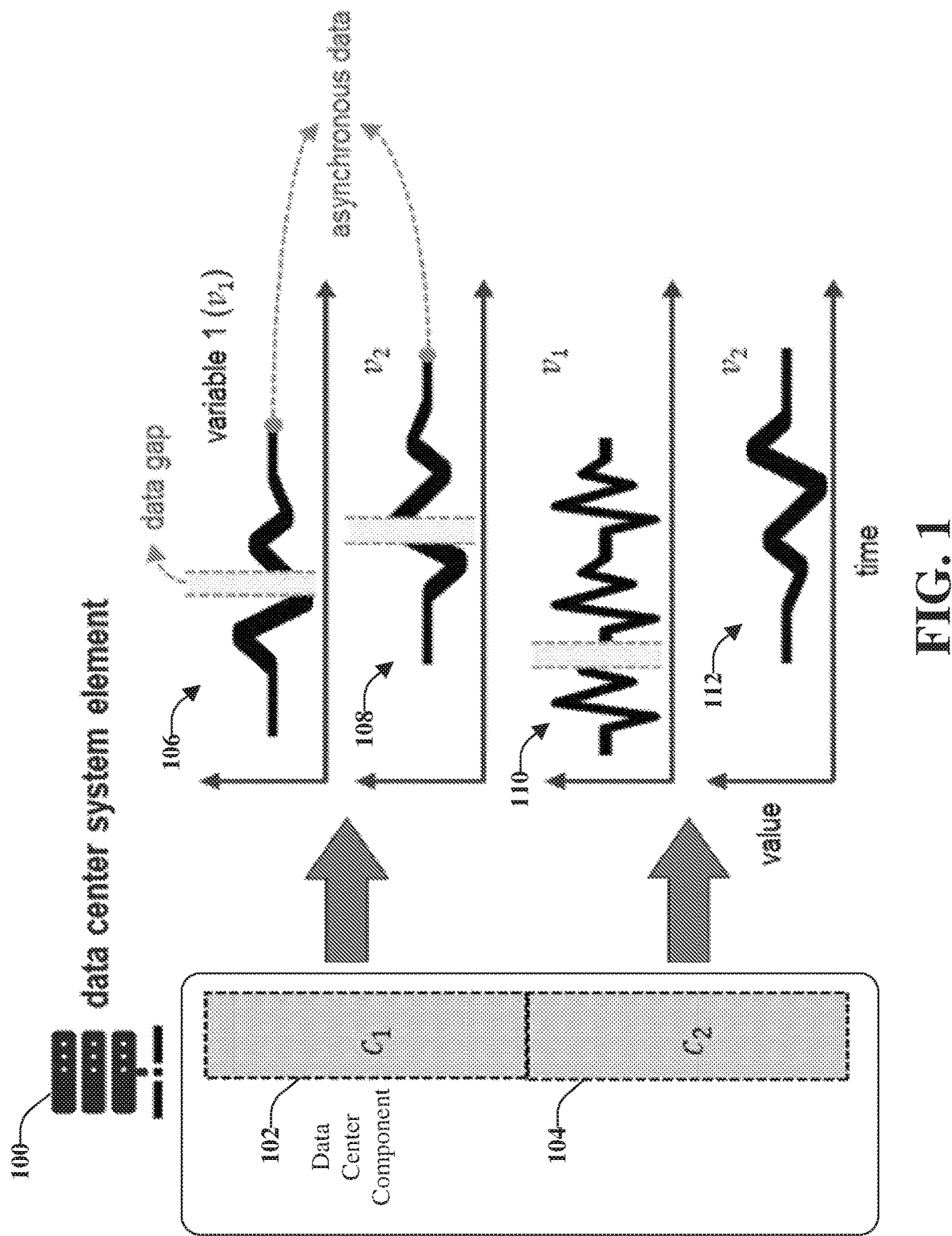
FIG. 1 illustrates example, non-limiting, telemetry collected by components of a data center system element in accordance with one or more embodiments described herein.

FIG. 1 illustrates example, non-limiting, telemetry collected by components of a data center system element 100 in accordance with one or more embodiments described herein. In an example, storage systems (e.g., storage platforms) enable collection of telemetry data and store the telemetry data in log files. The data center system element 100 can comprise one or more components (e.g., nodes). Illustrated are two components, namely, a first component 102 (c1) and a second component 104 (c2). Each data center component collects telemetry data of two variables. For example, the first component 102 (c1) collects telemetry data of a first variable 106 (v1) and telemetry data of a second variable 108 (v2) and the second component 104 (c2) collects telemetry data of another first variable 110 (v1) and telemetry data of another second variable 112 (v2). It is noted that although discussed with respect to the collection of two variables, the disclosed aspects are not limited to this implementation and any number of variables can be collected from the system components or nodes. Further, although discussed with collection of the same quantity of variables, the system components (nodes) can collect a different number of variables (e.g., the first component 102 (c1) can collect two variables and the second component 104 (c2) can collect three variables, and so on. Telemetry collection can be activated manually and thus, there is no consistency control over which variables should be collected, and for what time interval they should be collected, to solve a specific analytics problem (e.g., anomaly detection).

As indicated in FIG. 1, the telemetry data of the first variable 106 (v1) and the telemetry data of a second variable 108 (v2) can be asynchronous data. Further, the telemetry data of the other first variable 110 (v1) and the telemetry data of the other second variable 112 (v2) can be asynchronous data.

Based on this scenario, temporal data management aspects discussed herein can transform the available telemetry into formats that are more amenable to analytics processes. The various aspects provided herein facilitate temporal data management that performs these data processing steps on data center telemetry to improve data quality and improve accuracy of anomaly detection. With the disclosed aspects, the variety of log files and telemetry variables, the data gaps, and the lack of synchronicity on datasets are considered. The disclosed aspects can mitigate some of the performance challenges associated with handling the huge volume of telemetry data. For example, performance challenges can include, but are not limited to, the lack of time synchronicity on datasets. Further, the various aspects provide temporal data management that can tackle different challenges related to the problem of anomaly detection in data centers.

As discussed above, various challenges exist with respect to traditional anomaly detection. By way of example and not limitation, the problem of managing temporal data for anomalous state detection in data center system elements poses various challenges. For example, such challenges include, but are not limited to, diversity of data types, presence of meaningless variables, hidden information, data gaps over time, and/or asynchronous telemetry within data centers.

As it relates to the challenge of diversity of data types, data center telemetry could be stored in dozens of different formats, which vary according to the type of the computational resource (e.g., computing, network, and storage system) and/or its vendor. With so many data formats, it can be time consuming and error-prone to employ ad-hoc programs for accessing, parsing, tokenizing, and extracting raw data stored in the data for each computational resource. As a result, Extract, Transform, and Load (ETL) processes are often required for managing and aggregating those large amounts of data. However, due to the particularities of each data format, ETL processes are hardly ever generalizable, and each problem often requires its own data pre-processing pipelines to prepare the data for further analysis.

Presence of meaningless variables is another challenge. Data centers produce hundreds of variables that can be monitored. With so many variables, the problem of detecting anomalous states is generally affected by the curse of dimensionality. There are some circumstances in which a variable is absent from some data center components or the number of collected samples is not enough to be used in the analytical approach (e.g., an anomaly detection method). This could render many variables meaningless for the analytics method. Tracking those cases in a large set of data and defining quality criteria for the selection of useful variables can be challenging.

For the challenge of hidden information, variables stored in log files and collected by ETL processes may not be so relevant a priori to solve the analytical problem (e.g., anomaly detection). However, these variables could contain hidden information of which a model could take advantage. For example, component-based variables provided by storage system cluster could give a precious indication of the health of each component (e.g., node) in data centers. Nevertheless, it is difficult to use them in raw format in an anomaly detection method. In this scenario, specific transformations could be required in order to enable the use of such variables in the analytics process.

Figure 2:
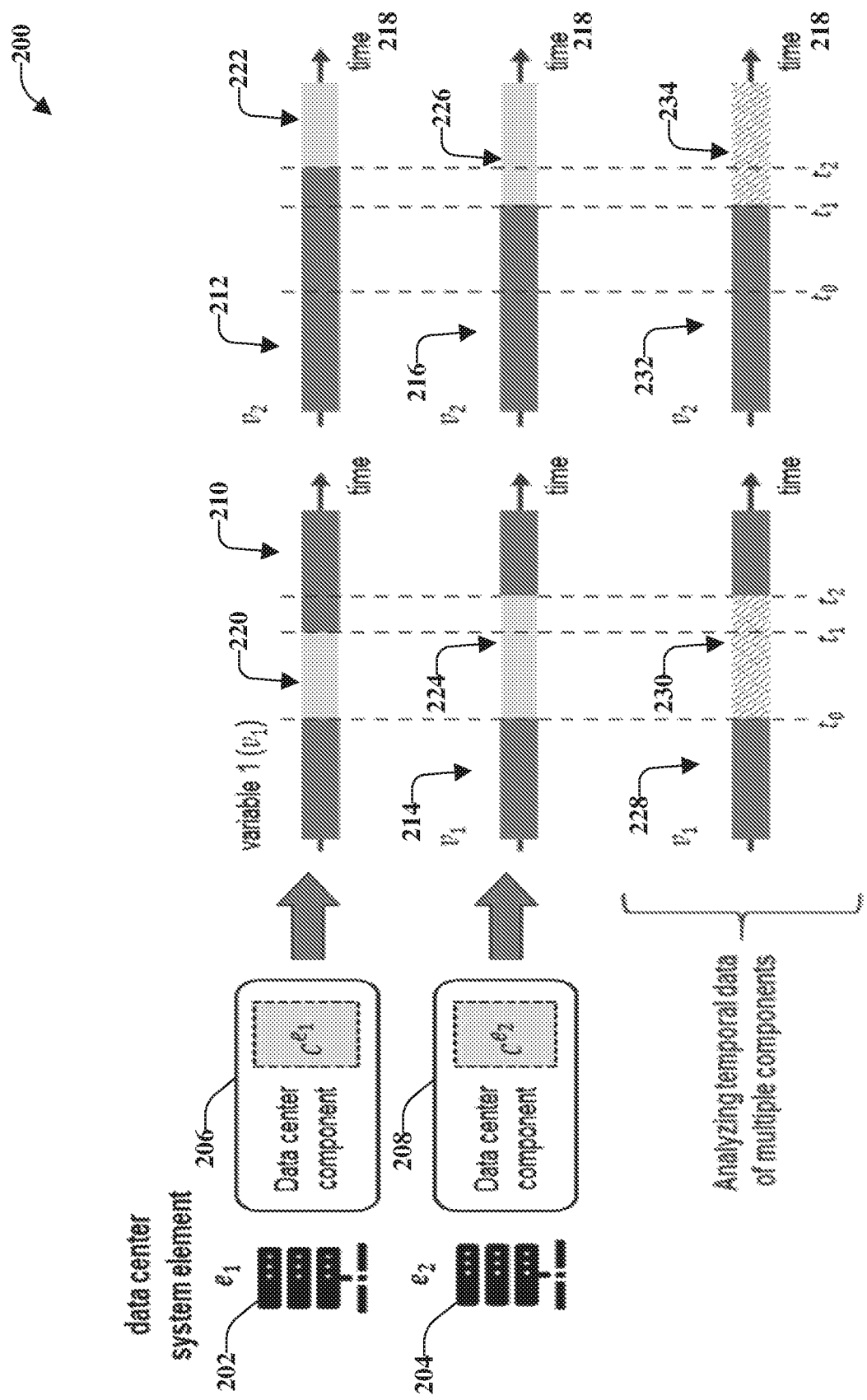
FIG. 2 illustrates an example, non-limiting, representation of data gaps in telemetry of data center components.

Data gaps over time is another challenge to be addressed. In real-world data centers, data gaps are common in the telemetry data due to the unavailability of monitoring components (hardware issues, software issues, and/or configuration issues) or even due to various decisions (e.g., rules, policies, programming, and so on). FIG. 2 illustrates an example, non-limiting, representation 200 of data gaps in telemetry of data center components. Illustrated are two data center system elements, namely, a first element 202 (e1) and a second element 204 (e2). The first element 202 (e1) can comprise a first data center component 206 (ce1) and the second element 204 (e2) can comprise a second data center component 208 (ce2).

The first data center component 206 (ce1) can output (or provide) telemetry data related to one or more variables, illustrated as telemetry data of a first variable 210 (v1) and telemetry data of a second variable 212 (v2). The second data center component 208 (ce1) can output (or provide) telemetry data of one or more variables, illustrated as telemetry data of a first variable 214 (v1) and telemetry data of a second variable 216 (v2). Although illustrated as both data center components outputting the two variables, more than two variables can be output by the data center components. Further, although illustrated and described as outputting the same number of variables, the data center components can output a different number of variables. Time 218 is represented by the vertical lines that mark defined points in time on the horizontal time axis.

As illustrated in the example of FIG. 2, the telemetry data of the first variable 210 (v1) output by the first data center component 206 (ce1) has a data gap 220 between time span [t0,t1]. The telemetry data of the second variable 212 (v2) output by the first data center component 206 (ce1) has a data gap 222 after time t2 (e.g., from time t2 to a subsequent time, such as time t3 (e.g., time span [t2,t3]). Additionally, the telemetry data of the first variable 214 (v1) output by the second data center component 208 (ce1) has a data gap 224 between time span [t0,t2]. The telemetry data of the second variable 216 (v2) output by the second data center component 208 (ce2) has a data gap 226 after time t1 (e.g., between time span [t1,t2], and from time t2 to a subsequent time, such as time span [t2,t3]).

During a process to analyze temporal data of multiple components (e.g., the first data center component 206 (ce1) and the second data center component 208 (ce1) in this example), large gaps in the data occur. For example, for an aggregate of the first variables 228 (e.g., the first variable 210 (v1), the first variable 214 (v1)), there is a data gap 230 between time span [t0,t2]. The data gap 230 represents the data gap 220 and the data gap 224. Further to this example, for an aggregate of the second variables 232 (e.g., the second variable 212 (v2), the second variable 216 (v2)), there is a data gap 234 after time t1 (e.g., from time t1 to time t2, and from time t2 to a subsequent time or between time span [t1,t3]). The data gap 234 represents the data gap 222 and the data gap 226.

Anomaly detection methods should be aware of these data gaps. Data imputation is a conventional practice used to solve data gaps, but the practice generally adds bias to the data. Conversely, reducing the data to just the time windows over which all data is available might be too drastic. In the example of FIG. 2, for an aggregate of the first variables 228, this would result in the use of only the data before time t0 and the data after the time t2. Further, for an aggregate of the second variables 232, this would result in the use of only the data before time t1. In some situations, using the data "as is" might be beneficial or practical, but a method to circumvent the consequences of data gaps becomes necessary and is provided herein.

Asynchronous telemetry within data centers is yet another challenge to be addressed. Since telemetry data collection mechanisms can be activated or deactivated any time in their corresponding data center components, telemetry may cover different time spans. This means that the first data center component 206 (ce1) could present telemetry data over time span [t0,t1] and a second data center component 208 (ce2) could present telemetry data over time span [t2,t3], where t0<t1<t2<t3, so that telemetries from these components are desynchronized. Thus, when telemetry data of c1 is available, telemetry data of c2 might not be available, and vice-versa. Since desynchronized telemetry within real data centers components is common, temporal data management methods should present additional features to guarantee temporal consistency, as provided herein.

The various aspects provided herein facilitate temporal data management that performs processing steps on data center telemetry to improve data quality. Consequently, these data processing steps could also increase the accuracy of an anomaly detection system. With such process, variety of log files, and telemetry variables, the data gaps, the lack of time synchronicity on datasets, and the main performance challenges associated with handling the huge volume of data can be considered as provided herein.

Anomaly detection systems can be applied in contexts with inherent complexity and large volumes of data, such as data center management, industrial applications, and in financial scenarios. In data center management and resource administration, for example, neglecting anomalies can lead to malfunction, failures, and/or suboptimal allocation of computational resources. All these problems ultimately can result in financial loss and long-term operational problems. Therefore, properly detecting anomalies can empower the derivation of an action plan for each state of interest, either by preventing a disruptive effect from subsequent states, triggering self-tuned policies to handle such events, or acting in a timely manner to diminish losses.

As mentioned, to detect anomalies in a data center, its computing, network and storage systems are monitored, and its normal behavior is established from any collected data. If any system is outside what has been established as normal ranges at any given time, the monitoring application can trigger warnings or correction policies to circumvent the abnormal behavior. A main difficulty for the detection of anomalies in data center operations is the overwhelming number of variables to monitor. For example, a single storage system can contain a cluster with tens of nodes, each node collecting data for more than a hundred variables. Identifying the important variables to monitor can make the anomaly detection problem more tractable and thus provide some guidance for the challenging process of finding its root causes.

Figure 3:
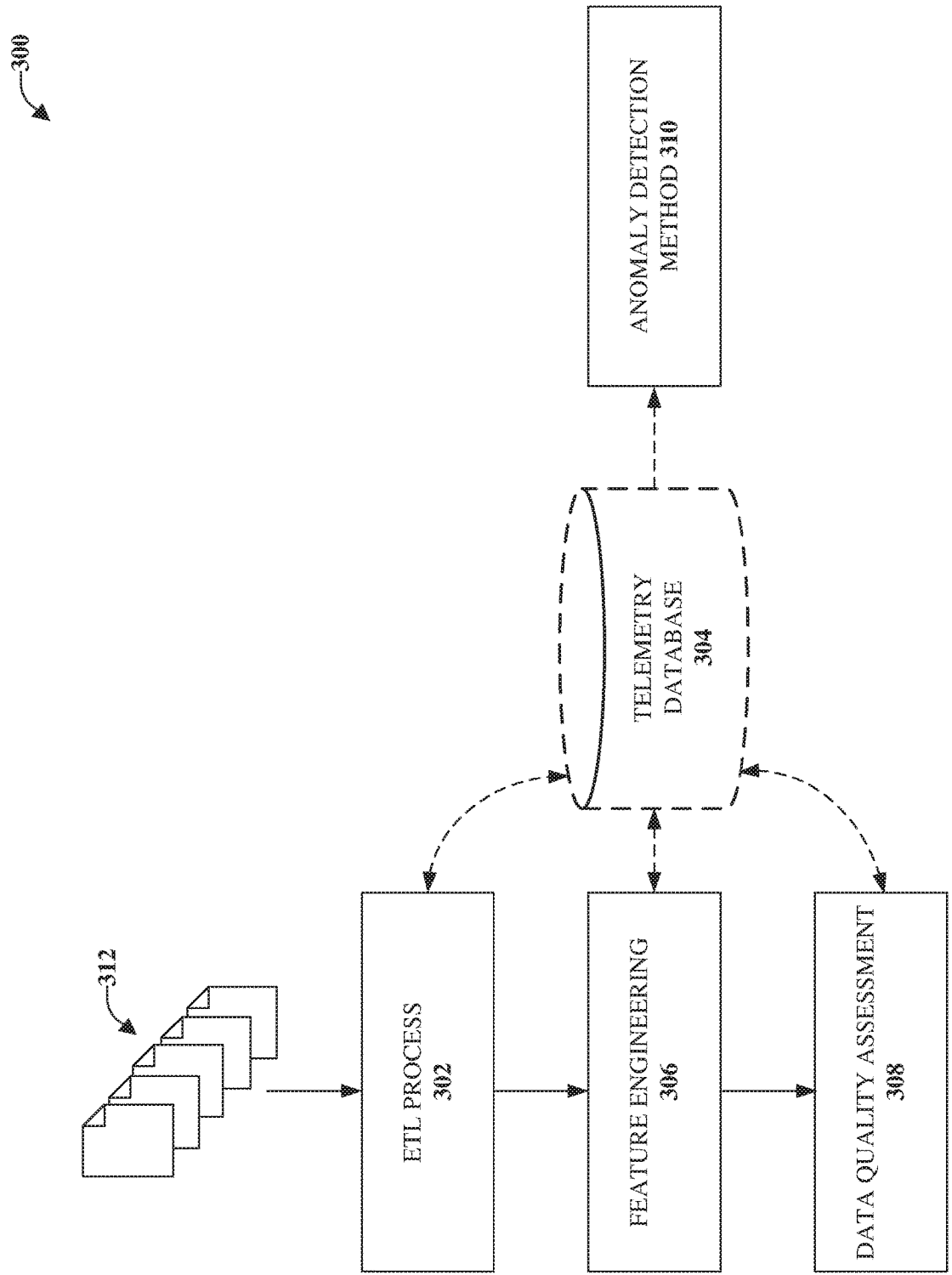
FIG. 3 illustrates a flow diagram of an example, non-limiting, computer-implemented method in accordance with one or more embodiments described herein.

FIG. 3 illustrates a flow diagram of an example, non-limiting, computer-implemented method 300 in accordance with one or more embodiments described herein. More specifically, the computer-implemented method 300 facilitates temporal data management The computer-implemented method 300 provides a sequence of data processing steps that include an Extract, Transform, and Load Process (ETL process 302). The ETL process 302 can access, parse, tokenize, extract, and load telemetry from multiple data sources (e.g., different configuration, workload, and performance variables) into an external repository (e.g., database, such as the illustrated telemetry database 304). The data processing steps of the computer-implemented method 300 can also include feature engineering 306, which can create new features using domain knowledge to make machine learning algorithms work. Also included in the data processing steps of the computer-implemented method 300 is data quality assessment 308. During the data quality assessment 308, temporal data quality can be assessed and select data center system elements with relevant telemetry (e.g., regarding the presence in all system elements, and their temporal consistency) can be selected for an anomaly detection method 310.

As mentioned above, data center system elements routinely store telemetry in log files 312. Accordingly, the computer-implemented method 300 can access, parse, tokenize, extract, and load the telemetry from data sources (e.g., the log files 312) into an external repository (e.g., the telemetry database 304), which is referred to as the ETL process 302. The ETL process 302 can consume raw data files (as input data) and can return one or more time series. Each time series of the one or more time series can comprise values of a specific variable. In this case, a variable refers to the configuration, workload, or performance of a given data center component.

In a real-world scenario, a data center system element can comprise several components, each of which has its own variables for reporting its configuration, workloads, and responses (or performance). Moreover, each variable can store its temporal data in a specific or defined file format. For example, file formats are often differentiated by their variable type (configuration, workload, performance) or the granularity of telemetry (temporal data for each data center component or for the whole data center system element). Therefore, the ETL process 302 can be adaptable.

As discussed herein with respect to FIG. 4 below, the data processing step can instantiate any cartridge in an architecture for the ETL process 302. Thus, each cartridge addresses the ETL process 302 of a given file format. Moreover, the disclosed aspects can scale out when there are many data center system elements, such as storage systems or storage platforms, when cartridges are available for their ETL process. For example, as utilized herein cartridges are a composable architecture of data management services that can be used and reused as necessary.

Figure 4:
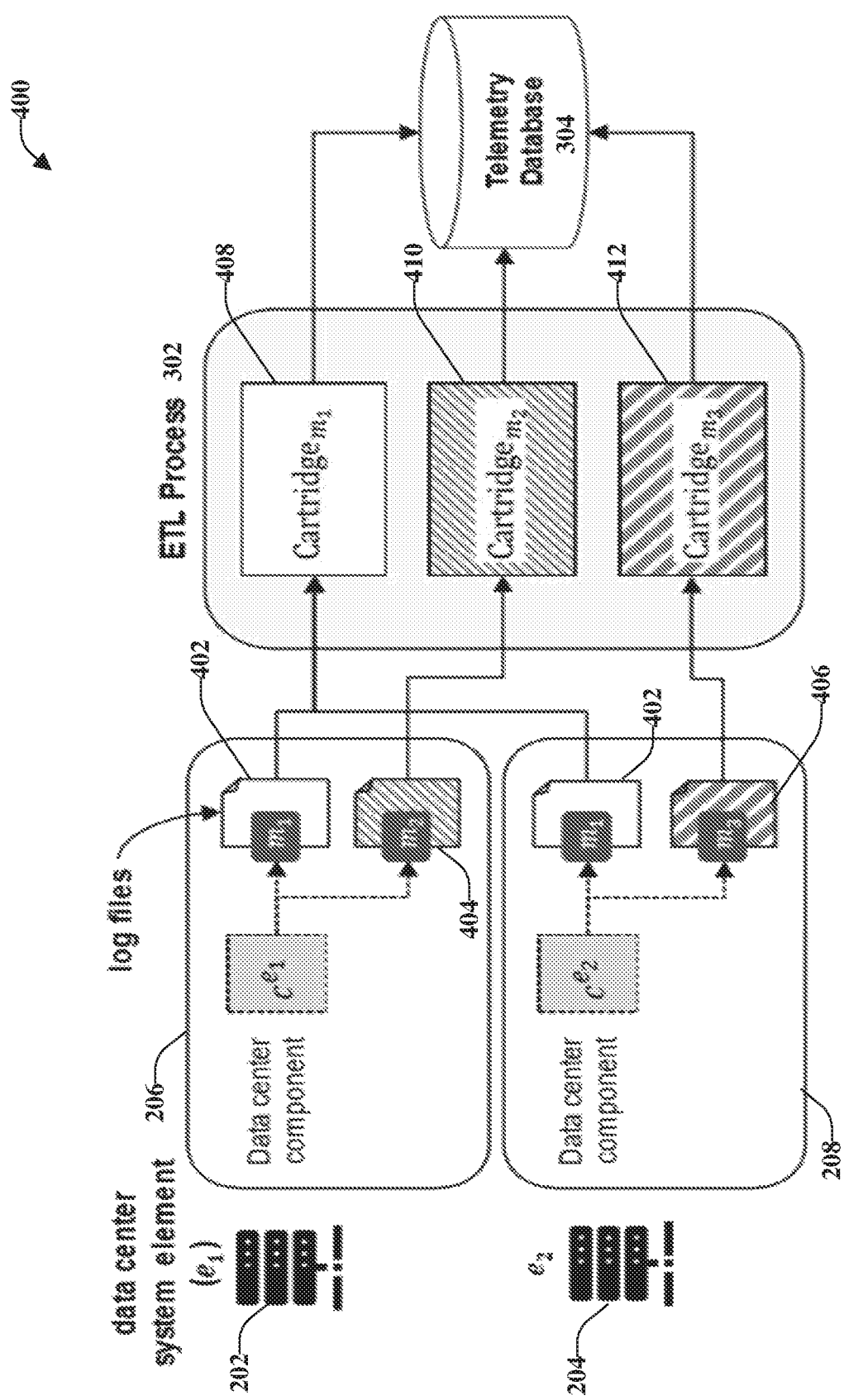
FIG. 4 illustrates example, non-limiting, cartridges for an extract, transform, and load process on multiple log file formats in accordance with one or more embodiments described herein.

FIG. 4 illustrates example, non-limiting, cartridges for an extract, transform, and load process (e.g., the ETL process 302) on multiple log file formats in accordance with one or more embodiments described herein. Repetitive description of like elements employed in other embodiments described herein is omitted for sake of brevity. More specifically, FIG. 4 illustrates how the architecture for the ETL process 302 can be generalized for several log files and deliver data in an integrated telemetry database.

For example, the first data center component 206 (ce1) utilizes a first log file 402 (m1) and a second log file 404 (m2). The second data center component 208 (ce2) utilizes the first log file 402 (m1) and a third log file 406 (m3). For the ETL process 302 one or more cartridges can be defined for different types of log files, for example. The cartridges can be components utilized during the ETL process 302. The cartridges can be modular, such that an appropriate cartridge can be utilized based on the log files under consideration.

In the illustrated example, a first cartridge 408 is associated with the first log file 402 (m1), a second cartridge 410 is associated with the second log file 404 (m2), and a third cartridge 412 is associated with the third log file 406 (m3). Accordingly, to perform the ETL process, the first cartridge 408 is utilized for the log files (e.g., the first log files 402 (m1) of both the first data center component 206 (ce1) and the second data center component 208 (ce2).

Some variables stored in log files 312 and collected by the ETL process 302 might not be usable in their raw format to detect anomalous states in data centers. However, these variables could contain valuable hidden information of which the anomaly detection method 310 could take advantage.

More specifically, in real scenarios, data center system elements (such as storage systems or storage platforms) generate telemetry that contains information about each of its components (or storage nodes). These component-based variables could provide a precious indication of the health of each data center component, instead of the whole system element. Nevertheless, it might be difficult for an anomaly detection method to leverage such information in an aggregate form, since each data center system element could present different configuration of several components.

Based on these issues, the disclosed aspects can, during the feature engineering 306, create features derived from the component-based variables with the purpose of using the created features in aggregate form in machine learning algorithms for anomaly detection (e.g., the anomaly detection method 310). These variables can correspond to different components of storage systems or storage platforms, such as multiple CPUs, multiple storage devices, and multiple network adapters.

New features can be created by computing, at each time stamp of each variable, functions such as, for example, the mean value across all components at the given time stamp. Another new feature can be the standard deviation of the values at the given time stamp. Yet another new feature can be the maximum deviation from the mean value at the given time stamp. Another new feature can be the entropy of the values across all components at the given time stamp. Other new features can be realized with the one or more aspects discussed herein.

Figure 5:
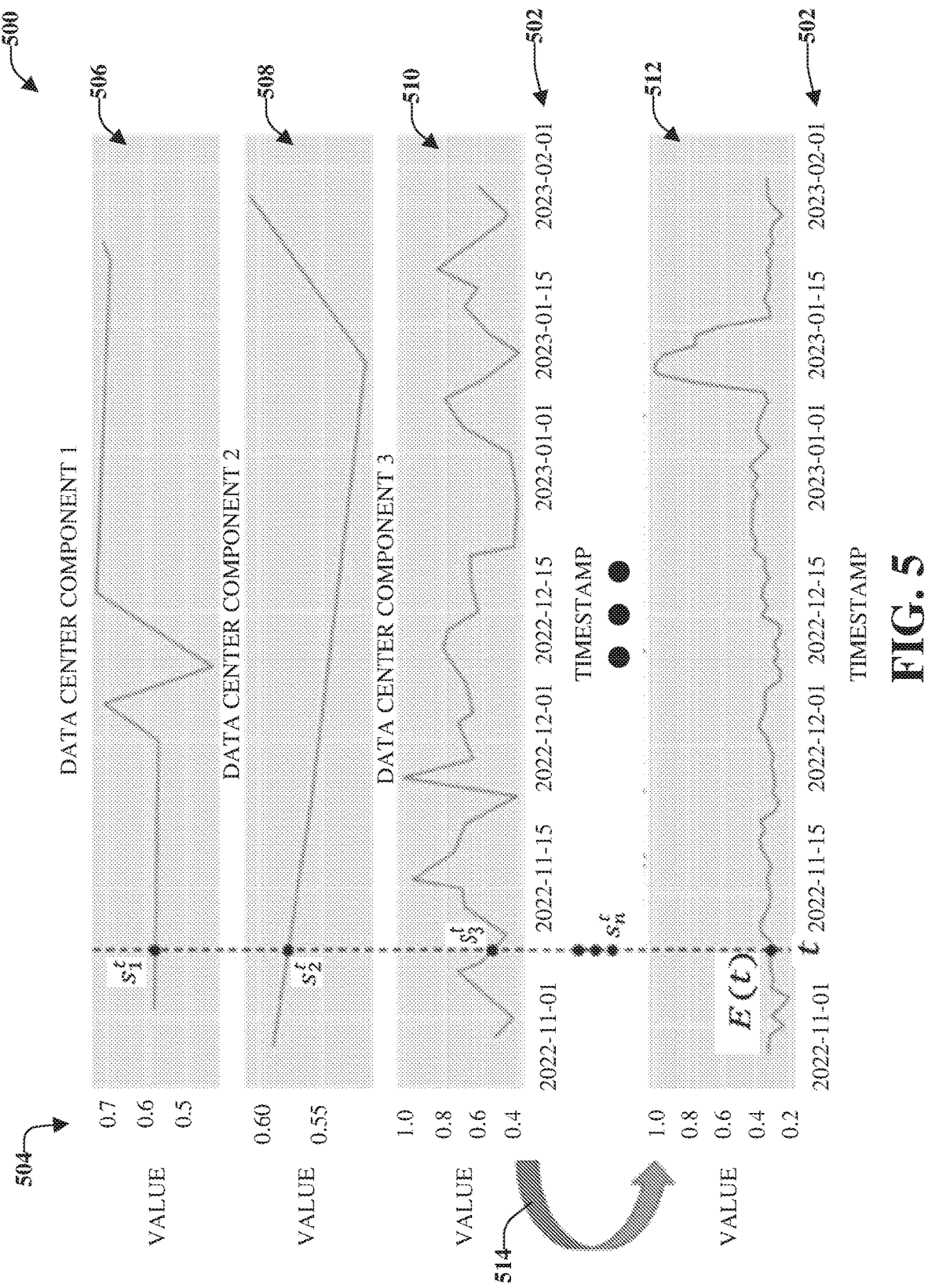
FIG. 5 illustrates an example, non-limiting, representation of an entropy aggregate function in accordance with one or more embodiments described herein.

By doing this, an overview of the behavior of all similar components over a uniform representation can be obtained, irrespective of the number of components of each data center system element. FIG. 5 illustrates an example, non-limiting, representation 500 of an entropy aggregate function in accordance with one or more embodiments described herein. For example, the feature engineering 306 can be based on a component-based variable, when applied to the entropy function to all components over time. Time entries 502 are illustrated on the horizontal axis and values 504 are illustrated on the vertical axis.

More specifically, the top portion of FIG. 5 illustrates daily telemetry of multiple data center components for a measurement of a defined telemetry variable. Illustrated are first telemetry data 506 for a first data center component, second telemetry data 508 for a second data center component, and third telemetry data 510 for a third data center component.

The bottom portion of FIG. 5 illustrates values 512 determined based on an entropy aggregate function 514

(referred to as E). More specifically, illustrated at the bottom portion is the entropy of multiple data center components (e.g., the first data center component, the second data center component, and the third data center component) for measurement of the defined telemetry variable. Thus, it represents the entropy aggregate function on a component-based variable.

With continuing reference to FIG. 3, data centers can have from hundreds to thousands of variables that can be monitored for the occurrence of anomalies. For example, data related to, but not limited to, storage or data stores, servers, switches, cooling monitoring, security, and so on, can be aggregated telemetry. With so many variables, the problem is generally affected by the curse of dimensionality. Therefore, in situations where many variables are to be used in a model associated with the anomaly detection method 310, it can be beneficial to identify which of the variables are the most relevant to analyze and which variables, ultimately, facilitate the anomaly detection process. In other words, it is beneficial to identify the target variables of the anomaly detection model, which can be performed with the data quality assessment 308.

Another concern before making machine learning algorithms work efficiently is associated with the quality of temporal data. Thus, it is important to have a good coverage of telemetry, which means that the same variables should be present in all data center elements and telemetry should contain a minimum number of samples (e.g., appropriate time coverage).

Considering these issues, during feature selection, the computer-implemented method 300 can select only relevant variables instead of keeping temporal data for all the variables (e.g., the relevant ones and the ones determined to not be relevant). This analysis of the relevance of variables is based on two sanity checks, namely, presence of data in all data center components and time coverage.

For example, suppose a machine learning model is to be built for the detection of anomalies in a data center. Let DC be the set of all its system elements. Additionally, let Φ be the set with the union of all telemetry variables associated with each data center element dc∈DC. The first check (e.g., presence of data in all data center components) is centered on the fact that telemetry of a variable might not be present in all data center system elements. Hence, the related data processing step investigates whether there is more than θ data center system elements with samples of a variable v. For short, $$V_{selected}=\{v: dc\_coverage(v)>\theta|v\in\Phi\}$$

where $$dc\_coverage(v)=|\{dc: has\_telemetry(dc,v)|dc\in DC, v\in\Phi\}|,$$

and has_telemetry(dc,v) is a function that returns "true" if dc has at least one sample of v, returning "false" otherwise. Then, this data quality assessment discards each variable v for which coverage(v)≤θ. As a result, this phase returns a set of valid variables, which is called $V_{selected}$.

Figure 6:
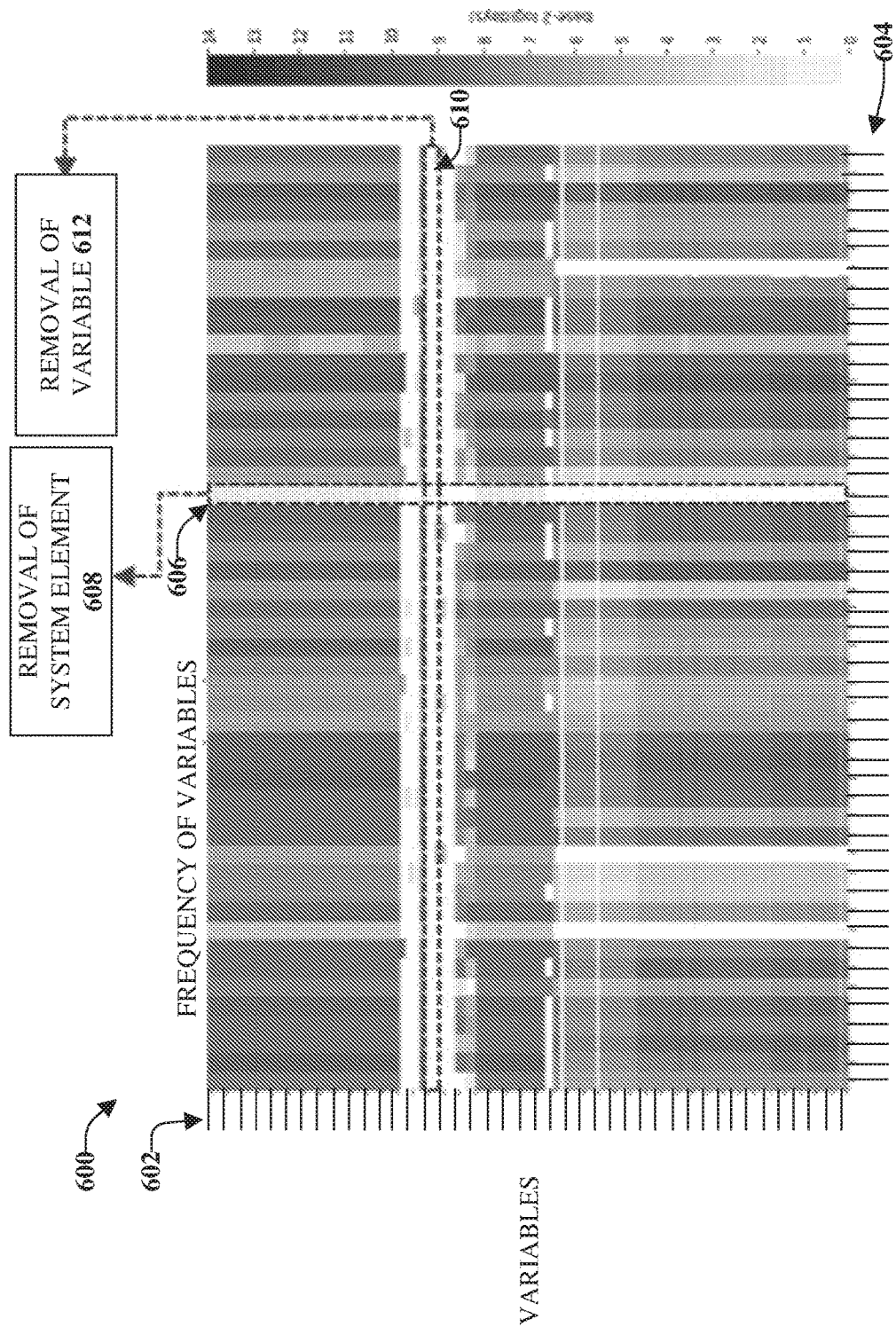
FIG. 6 illustrates an example, non-limiting, representation of data quality assessment of data center system elements in accordance with one or more embodiments described herein.

The second check (e.g., time coverage) can be executed after the first one, and it focuses on temporal quality assessment. Essentially data center system elements can be selected that have at least γ samples in all variables present in $V_{selected}$. For short, $$DC_{selected}=\{dc: time\_coverage(dc)=|V_{selected}|\},$$

where $$time\_coverage(dc)=|\{v: card(dc,v)>\gamma|dc\in DC, v\in V_{selected}\}|,$$

and card(dc,v) refers to the total number of samples available for the given variable v from data center system element dc. This minimum number of samples corresponds to the threshold for selecting data center elements that have enough temporal data to be used by the analytical approach, for example, and anomaly detection method. Examples of variable and system element removal are illustrated in FIG. 6. As a result, this phase returns a set of selected data center system elements, which is called $DC_{selected}$.

In further detail, FIG. 6 illustrates an example, non-limiting, representation 600 of data quality assessment of data center system elements in accordance with one or more embodiments described herein. Variables 602 are illustrated on the vertical axis, where each horizontal line represents a different variable (variable names have been removed for purposes of simplicity). Data center system element GUID 604 are illustrated on the horizontal axis, where each vertical line represents a different system element (system element names have been removed for purposes of simplicity). The frequencies of the variables are represented by the different shading.

A first data gap is illustrated by vertical column 606, within the dashed box. Due to this gap, the data quality assessment 308 can remove the entire vertical column 606, as indicated at 608. A second data gap is illustrated by horizontal row 610, within the dashed box. Due to this gap, the data quality assessment 308 can remove the entire horizontal row 610, as indicated at 612.

In addition to these data analysis phases, this quality check can perform an optional evaluation of temporal consistency of telemetry collected from data center system elements. Such evaluation aims at keeping only temporal sections of the data over which all telemetry variables are present. This addresses problems with data gaps, as discussed with respect to FIG. 2.

Figure 7:
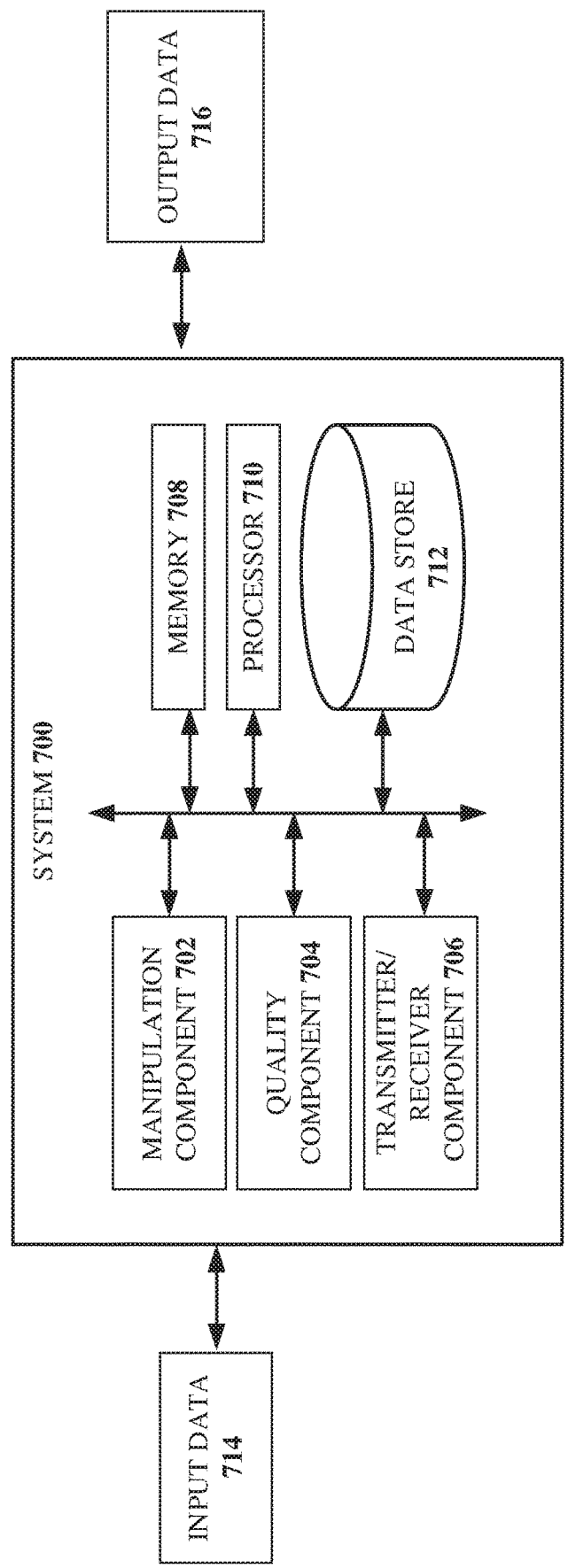
FIG. 7 illustrates a block diagram of an example, non-limiting, system for temporal data management for anomalous state detection in data centers in accordance with one or more embodiments described herein.

FIG. 7 illustrates a block diagram of an example, non-limiting, system 700 for temporal data management for anomalous state detection in data centers in accordance with one or more embodiments described herein. Repetitive description of like elements employed in other embodiments described herein is omitted for sake of brevity. The system 700 can comprise one or more of the components and/or functionality of the computer-implemented method 300 and vice versa.

Aspects of systems (e.g., the system 700 and the like), apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 700 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 700 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 700 (and the other embodiments described herein) can be utilized for temporal data management. The system 700 can facilitate data separation on an analysis pipeline, which can be useful for an anomaly detection system. A motivation associated with the disclosed aspects is quality of data that is provided to an anomaly detection system (or an anomaly detection engine). Thus, the system 700, as well as other aspects discussed herein, can facilitate manipulation of the data prior to the data being provided to the anomaly detection system.

An anomaly detection system can be utilized to detect anomalies in data center appliance (e.g., data center management). For example, data center management can relate to selecting telemetry values out of various parts of the data center appliance (e.g., CPU, hard disk, network, some software components, and so on). The telemetry variables can be collected over time and can generate a time series. Each point in time can have one value of that specific measurement.

As mentioned, problems associated with the collection of telemetry data can include, but is not limited to, diversity of data types, presence of meaningless variables, hidden information, data gaps over time, and/or asynchronous telemetry within data centers.

As illustrated, the system 700 can comprise a manipulation component 702, a quality component 704, a transmitter/receiver component 706, at least one memory 708, at least one processor 710, and at least one data store 712. The manipulation component 702 can convert input data 714 into data representative of a time series. The input data 714 can be, for example, raw data received from one or more log files (e.g., the log files 312) associated with a defined entity. According to some implementations, the manipulation component 702 can perform functions and/or implement instructions of the ETL process 302 of FIG. 3.

As utilized herein an entity can be one or more computers, the Internet, one or more systems, one or more commercial enterprises, one or more computers, one or more computer programs, one or more machines, machinery, and so forth, hereinafter referred to as an entity or entities depending on the context.

The quality component 704 can determine that a first set of variables of the defined variables satisfy a defined quality level. For example, the defined quality level can be related to, but not limited to, presence of data in all data center components and/or time coverage. According to some implementations, the quality component 704 can perform functions and/or implement instructions of the data quality assessment 308 of FIG. 3.

Thus, the quality component 704 can utilize a filtering approach to determine which set of variables are relevant and/or useful for a subsequent anomaly detection system. The quality component 704 can also determine which set of variables are not relevant and should be discarded or removed from consideration.

The transmitter/receiver component 706 can output the first set of variables, as output data 716. In an example, the first set of variables can be provided to an anomaly detection system and/or another system that performs modeling on data.

The at least one memory 708 can be operatively connected to the at least one processor 710. The at least one memory 708 can store executable instructions and/or computer executable components (e.g., the manipulation component 702, the quality component 704, the transmitter/receiver component 706, and so on) that, when executed by the at least one processor 710 can facilitate performance of operations. Further, the at least one processor 710 can be utilized to execute computer executable components (e.g., the manipulation component 702, the quality component 704, the transmitter/receiver component 706, and so on) stored in the at least one memory 708.

For example, the at least one memory 708 can store protocols associated with facilitating temporal data management as discussed herein. Further, the at least one memory 708 can facilitate action to control communication between the system 700 and other systems, one or more file storage systems, one or more devices, such that the system 700 employ stored protocols and/or algorithms to achieve improved overall performance of defined entities as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 710 can facilitate respective analysis of information related to temporal management of data. The at least one processor 710 can be a processor dedicated to analyzing and/or generating information received, a processor that controls one or more components of the system 700, and/or a processor that both analyzes and generates information received and controls one or more components of the system 700.

The transmitter/receiver component 706 can be configured to transmit to, and/or receive data from, for example, log files, a defined entity, an anomaly detection system, and/or other communication devices. Through the transmitter/receiver component 706, the system 700 can concurrently transmit and receive data, can transmit and receive data at different times, or combinations thereof.

Figure 8:
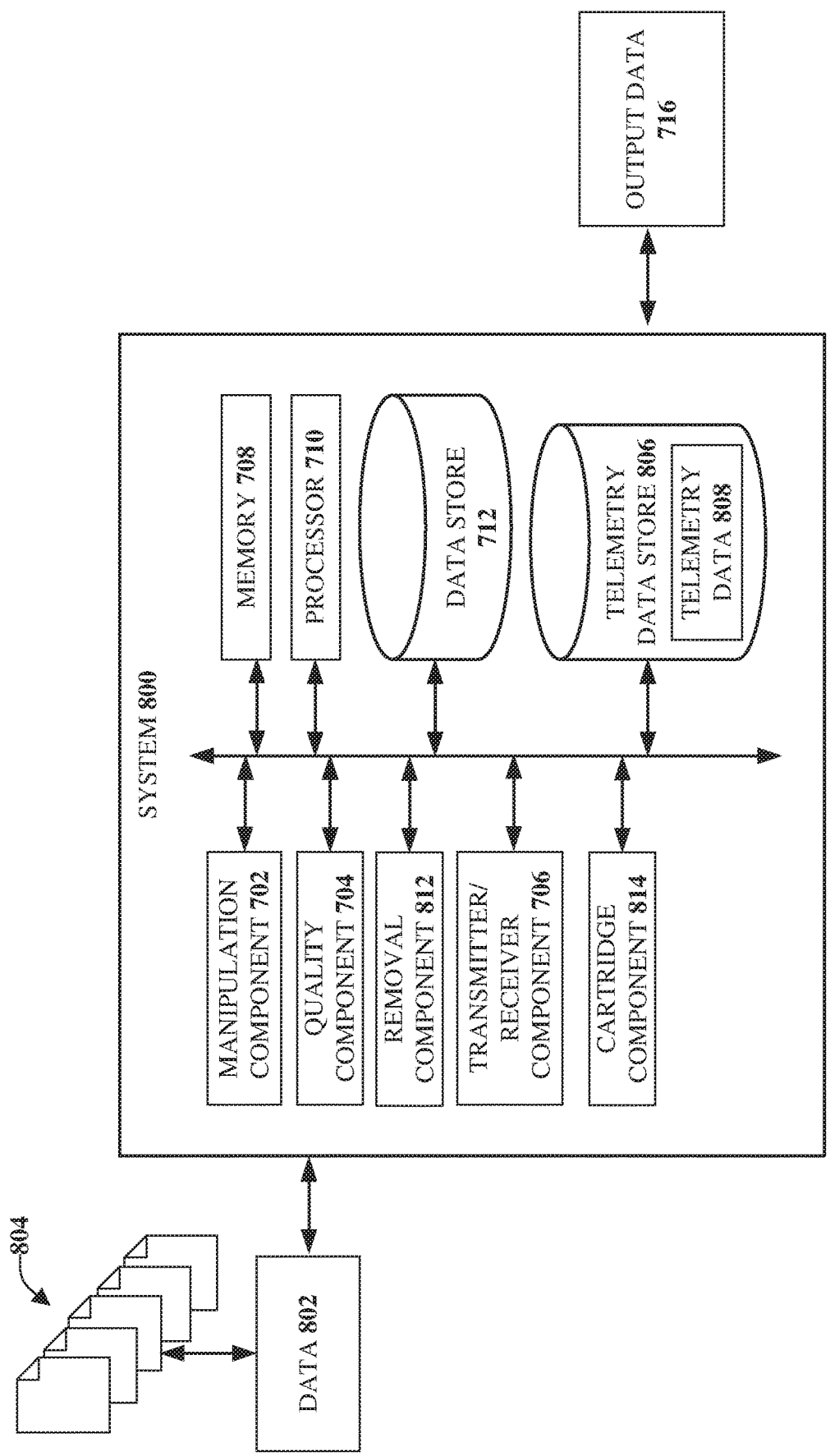
FIG. 8 illustrates a block diagram of an example, non-limiting, system for temporal data management using modular cartridges in accordance with one or more embodiments described herein.

FIG. 8 illustrates a block diagram of an example, non-limiting, system 800 for temporal data management using modular cartridges in accordance with one or more embodiments described herein. Repetitive description of like elements employed in other embodiments described herein is omitted for sake of brevity. The system 800 can comprise one or more of the components and/or functionality of the computer-implemented method 300, the system 700, and vice versa.

The manipulation component 702 can perform a process of extraction, transformation, and loading of data 802 (e.g., the input data 714) from log files 804 (e.g., the log files 312) into a telemetry data store 806. The data can be loaded into the telemetry data store 806 as telemetry data 808. According to some implementations, the telemetry data store 806 can be included, at least partially, in the at least one data store 712. However, in some implementations, the telemetry data store 806 can be separate from the at least one data store 712. In some implementations, the telemetry data store 806 can be located remote from, and accessible by, the system 700.

The quality component 704 can divide the telemetry data 810 into first telemetry data and second telemetry data. The first telemetry data can comprise telemetry data that does not satisfy a defined quality level. The second telemetry data can comprise telemetry data that satisfies the defined quality level. For example, the quality level can be defined based on rules and/or policies associated with the telemetry data, which can be determined, for example, based on an identification of a source of the telemetry data (e.g., a defined entity, a component or node of the defined entity, a data center element, and so on). In another example, the quality level can be defined based on whether the same variables should be present in all data center elements. The quality level can also be defined based on, for example, whether the telemetry data contains a minimum number of samples (e.g., an appropriate time coverage).

A deletion component 812 can remove the first telemetry data from the telemetry data store 806 based on the determination by the quality component 704 that the first telemetry data does not satisfy the defined quality level. The second telemetry data can be retained in the telemetry data store 806. Removal of the first telemetry data in this example can release resources (e.g., memory, processing power, and so on) and, according to some implementations, can increase a processing capability and/or processing efficiency due to the removal of unnecessary data.

The transmitter/receiver component 706 can output the second telemetry data (e.g., as the output data 716) based on a request for the second telemetry data. For example, the request can be received from an anomaly detection system that is configured to evaluate the defined entity. According to some implementations, the request can be received from another system configured to evaluate differences between various data.

The system 800 can also comprise a cartridge component 814 that can facilitate implementation of one or more cartridges. For example, the one or more cartridges can be modular cartridges, wherein a cartridge might be initiated (or might not be needed) based on the configuration of the data 802 and/or the log files 804. In another example, the one or more cartridges can be reusable cartridges. Thus, cartridges can be used multiple times by the system 800 (or the cartridge component 814), such as if a log file is used for multiple data center elements and/or if two or more log files (or associated data) utilize the same file format. Cartridges of the one or more cartridges can comprise instructions related to an ETL process as discussed herein.

By way of example and not limitation, the cartridge component 814 can facilitate implementation of a first cartridge selected from a group of cartridges (e.g., the one or more cartridges) for first data of the telemetry data 810 based on a first file format of the first data. The first cartridge can define a first conversion process for the first data. The cartridge component 814 can also facilitate implementation of a second cartridge selected from the group of cartridges for second data of the telemetry data 810 based on a second file format of the second data. The second cartridge can define a second conversion process for the second data. The cartridge component 814 can also facilitate implementation of subsequent cartridges for subsequent data of the telemetry data 180. The subsequent cartridges can define subsequent conversion processes for the subsequent data.

The cartridge component 814 can differentiate the file format for the respective data based on respective variable types of the data 802. Alternatively, the cartridge component 814 can differentiate the file format for the respective data based on respective granularities of telemetry data associated with the time series.

Figure 9:
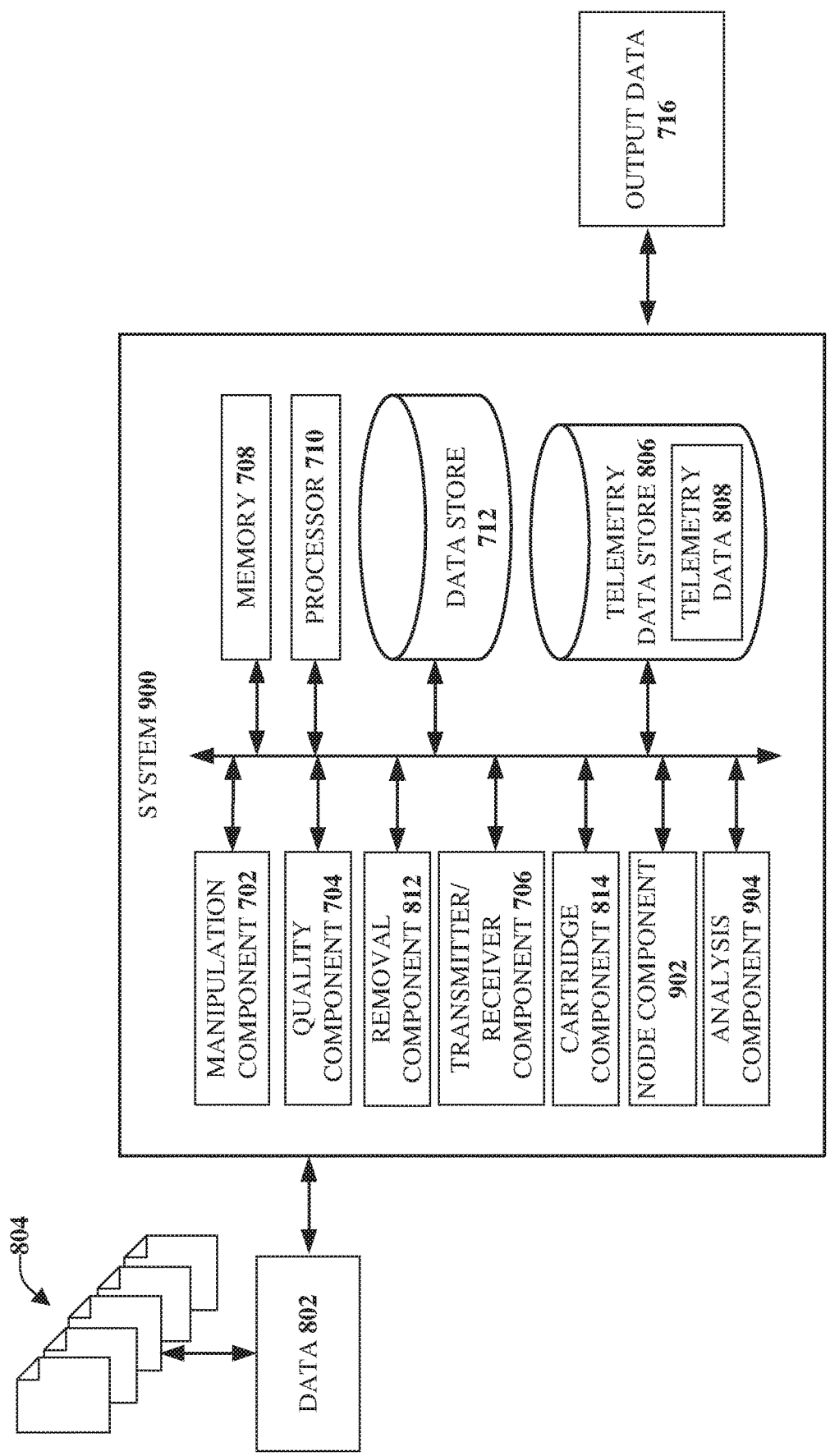
FIG. 9 illustrates a block diagram of an example, non-limiting, system for feature engineering in accordance with one or more embodiments described herein.

FIG. 9 illustrates a block diagram of an example, non-limiting, system 900 for feature engineering in accordance with one or more embodiments described herein. Repetitive description of like elements employed in other embodiments described herein is omitted for sake of brevity. The system 900 can comprise one or more of the components and/or functionality of the computer-implemented method 300, the system 700, the system 800, and vice versa.

The system 900 can comprise a node component 902 that can obtain data (e.g., the data 802) from a defined entity. For example, the data can be obtained from one or more data center components of the defined entity and can comprise one or more component-based variables (also referred to as node-based variables, or data center component-based variables).

An analysis component 904 can extract feature data from the one or more component-based variables. The feature data can provide indications of conditions of storage nodes of the defined entity. According to some implementations, the node component 902 and/or the analysis component 904 can perform functions and/or implement instructions of the feature engineering 306 of FIG. 3. The transmitter/receiver component 706 can output an aggregate of the feature data in a uniform format.

In an example, the analysis component 904 can determine a group of functions for the defined entity based on the second respective values of component-based variables. Further, the analysis component 904 can obtain an overview of respective behaviors of similar components of the defined entity based on the group of functions being represented uniformly across functions of the group of functions.

According to some implementations, the data can be raw data associated with the defined entity and obtained from the log files. The raw data can comprise respective values of component-based variables associated with a group of data center components of the defined entity. Thus, the analysis component 904 can generate features based on the respective values of the component-based variables, which can be output by the transmitter/receiver component 706.

To generate the features, the analysis component 904 can determine, at each time stamp of the second respective values of component-based variables, a mean value across data center components of the group of data center components. In some implementations, to generate the features, the analysis component 904 can determine at each time stamp of the second respective values of component-based variables, a standard deviation of values of data center components of the group of data center components. According to some implementations, to generate the features, the analysis component 904 can determine, at each time stamp of the second respective values of component-based variables, a maximum deviation for a mean value of data center components of the group of data center components. In alternative, or additional, implementations, to generate the features, the analysis component 904 can determine, at each time stamp of the second respective values of component-based variables, an entropy of values of data center components of the group of data center components.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 10:
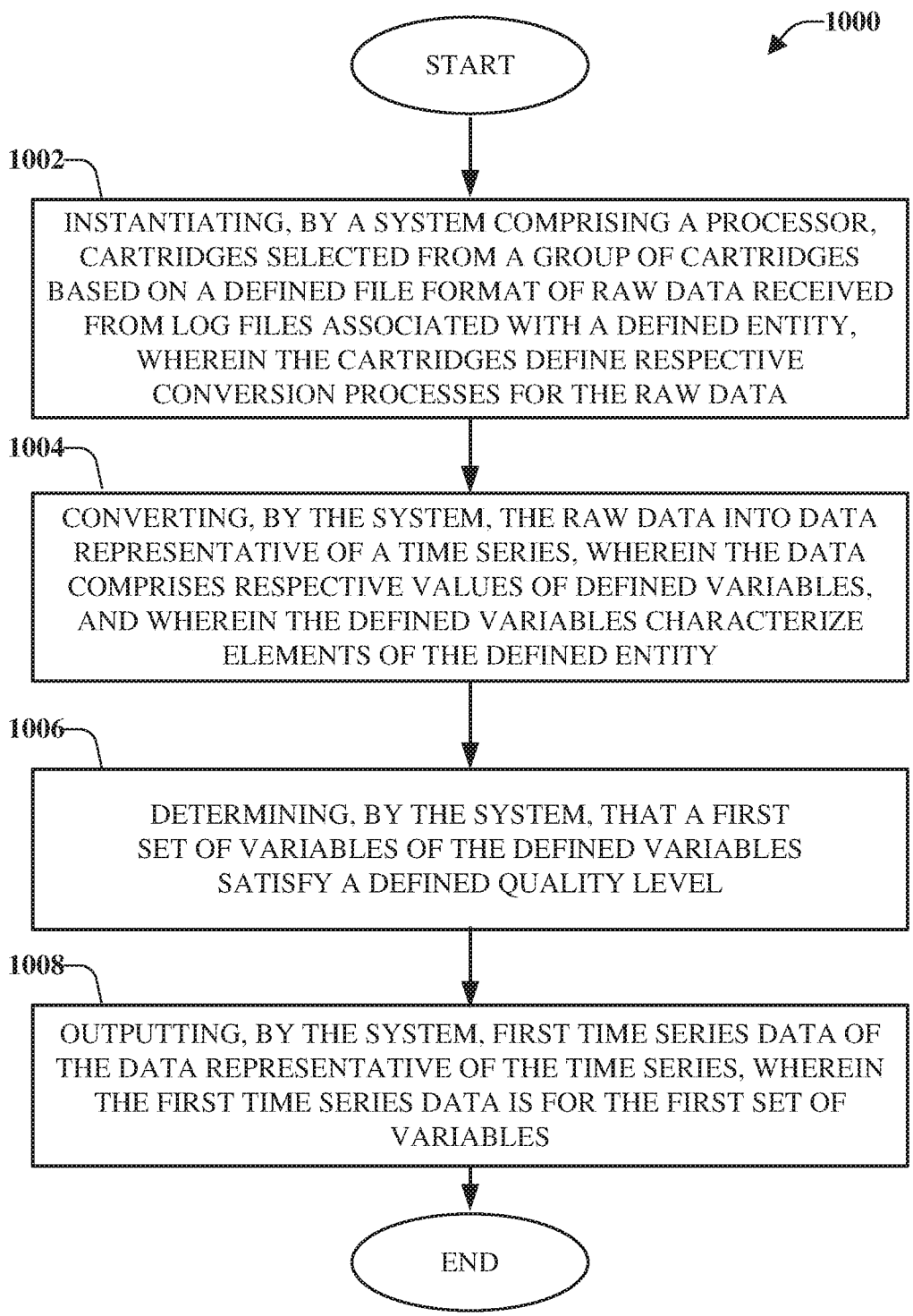
FIG. 10 illustrates a flow diagram of an example, non-limiting, computer-implemented method that facilitates temporal data management in accordance with one or more embodiments described herein.

FIG. 10 illustrates a flow diagram of an example, non-limiting, computer-implemented method 1000 that facilitates temporal data management in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

At 1002 of the computer-implemented method 1000, a device comprising a processor can instantiate cartridges selected from a group of cartridges based on a defined file format of raw data received from log files associated with a defined entity. The group of cartridges can be a composable architecture of data management services. The cartridges can define respective conversion processes for the raw data. For example, a first cartridge of the group of cartridges can define a first conversion process for first raw data. Further, a second cartridge of the group of cartridges can define a second conversion process for second raw data. In addition, subsequent cartridges of the group of cartridges can define subsequent conversion processes for subsequent raw data.

In an example, converting the raw data at 1002 can include instantiating cartridges selected from a group of cartridges based on a defined file format of the raw data, wherein the cartridges define respective conversion processes for the raw data. For example, the computer-implemented method 1000 can differentiate the defined file format from a group of file formats based on respective variable types of the raw data. In another example, the computer-implemented method 1000 can differentiate the defined file format from a group of file formats based on respective granularities of telemetry data associated with the time series. In some implementations, converting the raw data at 1002 can include normalizing the raw data into a common data format, wherein the raw data is received from different elements of the defined entity.

At 1004, the device can convert the raw data received into data representative of a time series. The data can comprise respective values of defined variables. The defined variables can characterize elements of the defined entity. The raw data can be converted, at 1004 based on the cartridges instantiated at 1002.

The computer-implemented method 1000, at 1006, can determine that a first set of variables of the defined variables satisfy a defined quality level. Further, at 1008, the device can output first time series data of the data representative of the time series, wherein the first time series data is for the first set of variables.

Figure 11:
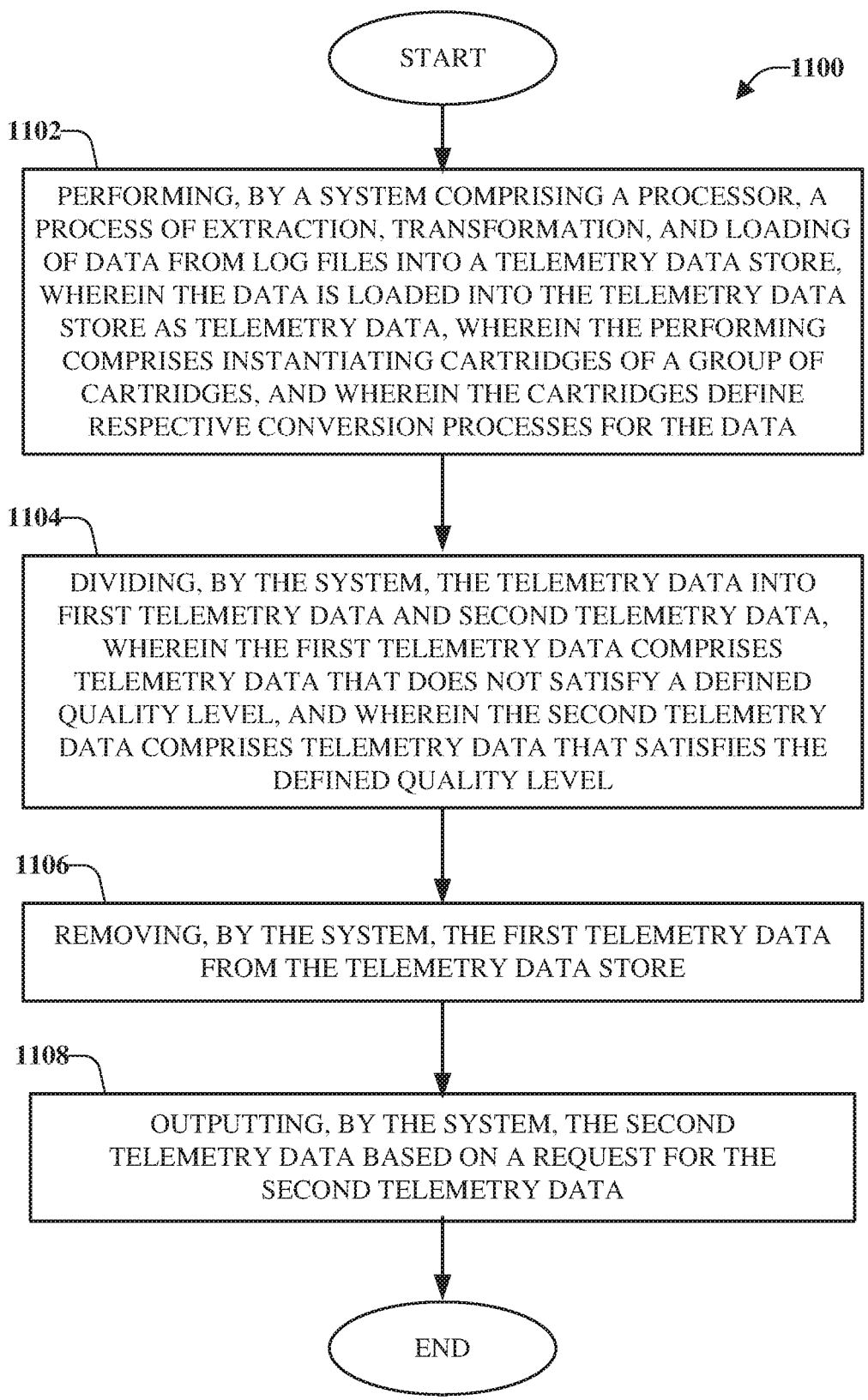
FIG. 11 illustrates a flow diagram of an example, non-limiting, computer-implemented method that facilitates removal of data in accordance with one or more embodiments described herein.

FIG. 11 illustrates a flow diagram of an example, non-limiting, computer-implemented method 1100 that facilitates removal of data in accordance with one or more embodiments described herein. Repetitive description of like elements employed in other embodiments described herein is omitted for sake of brevity.

At 1102 of the computer-implemented method 1100, a device can perform a process of extraction, transformation, and loading of data from log files into a telemetry data store. The data can be loaded into the telemetry data store as telemetry data. According to an implementation, performing the process of extraction, transformation, and loading can comprise instantiating cartridges of a group of cartridges. The cartridges can define respective conversion processes for the data.

Further, at 1104, the telemetry data can be divided into first telemetry data and second telemetry data. The first telemetry data can comprise telemetry data that does not satisfy a defined quality level. The second telemetry data can comprise telemetry data that satisfies the defined quality level. The first telemetry data can be removed from the telemetry data store at 1106. The second telemetry data can be output, at 1108. For example, the second telemetry data can be output based on a request for the second telemetry data.

Figure 12:
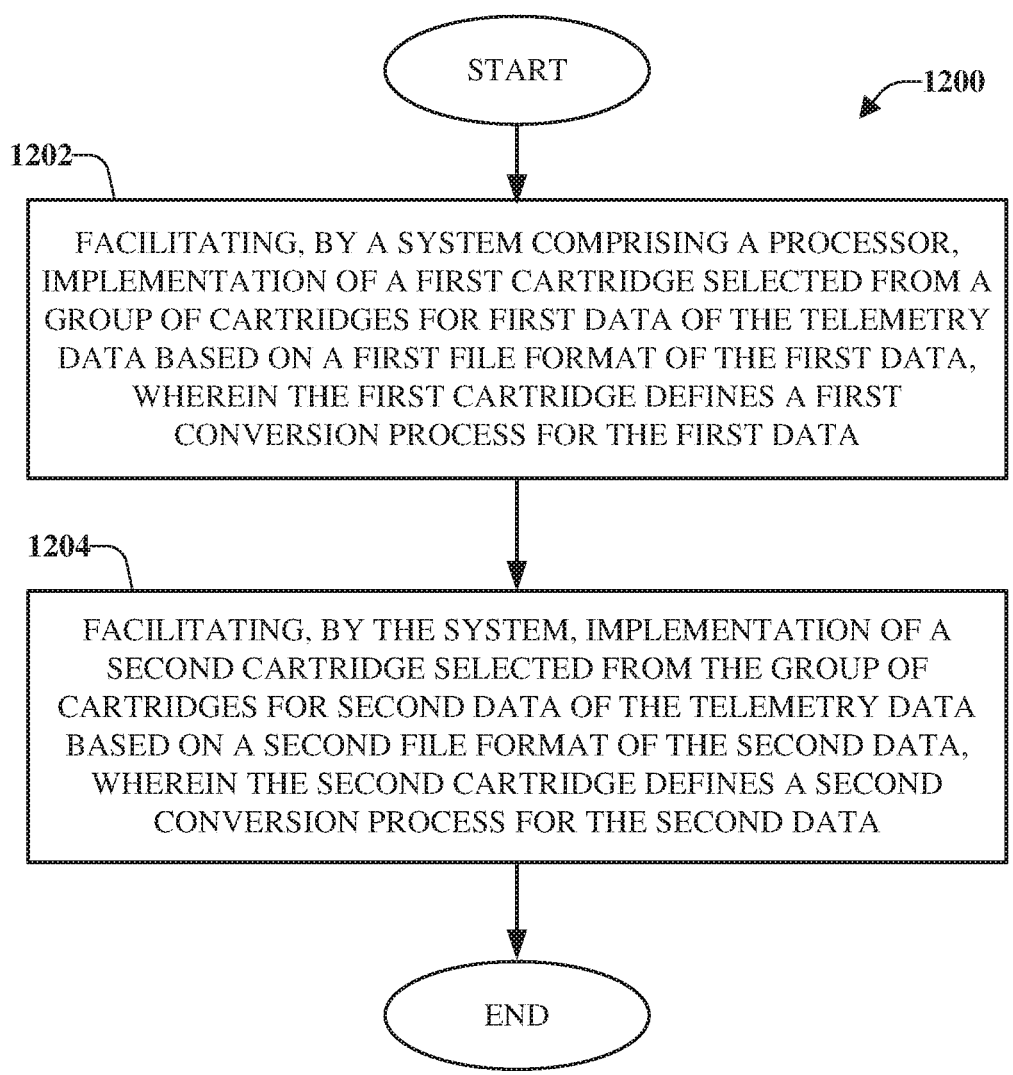
FIG. 12 illustrates a flow diagram of an example, non-limiting, computer-implemented method that facilitates usage of cartridges for temporal data management in accordance with one or more embodiments described herein.

FIG. 12 illustrates a flow diagram of an example, non-limiting, computer-implemented method 1200 that facilitates usage of cartridges for temporal data management in accordance with one or more embodiments described herein. Repetitive description of like elements employed in other embodiments described herein is omitted for sake of brevity.

At 1202 of the computer-implemented method 1200 implementation of a first cartridge selected from a group of cartridges for first data of the telemetry data based on a first file format of the first data is facilitated. The first cartridge can define a first conversion process for first data. Further, at 1204, implementation of a second cartridge selected from the group of cartridges for second data of the telemetry data based on a second file format of the second data can be facilitated. The second cartridge can define a second conversion process for the second data. Subsequent cartridges can also be implemented according to some implementations.

The computer-implemented method 1200 can be utilized for the conversion of raw data as discussed at 1002 of the computer-implemented method 1000. Alternatively, or additionally, the computer-implemented method 1200 can be utilized for the process of extraction, transformation, and loading as discussed with respect to 1102 of the computer-implemented method 1100.

Figure 13:
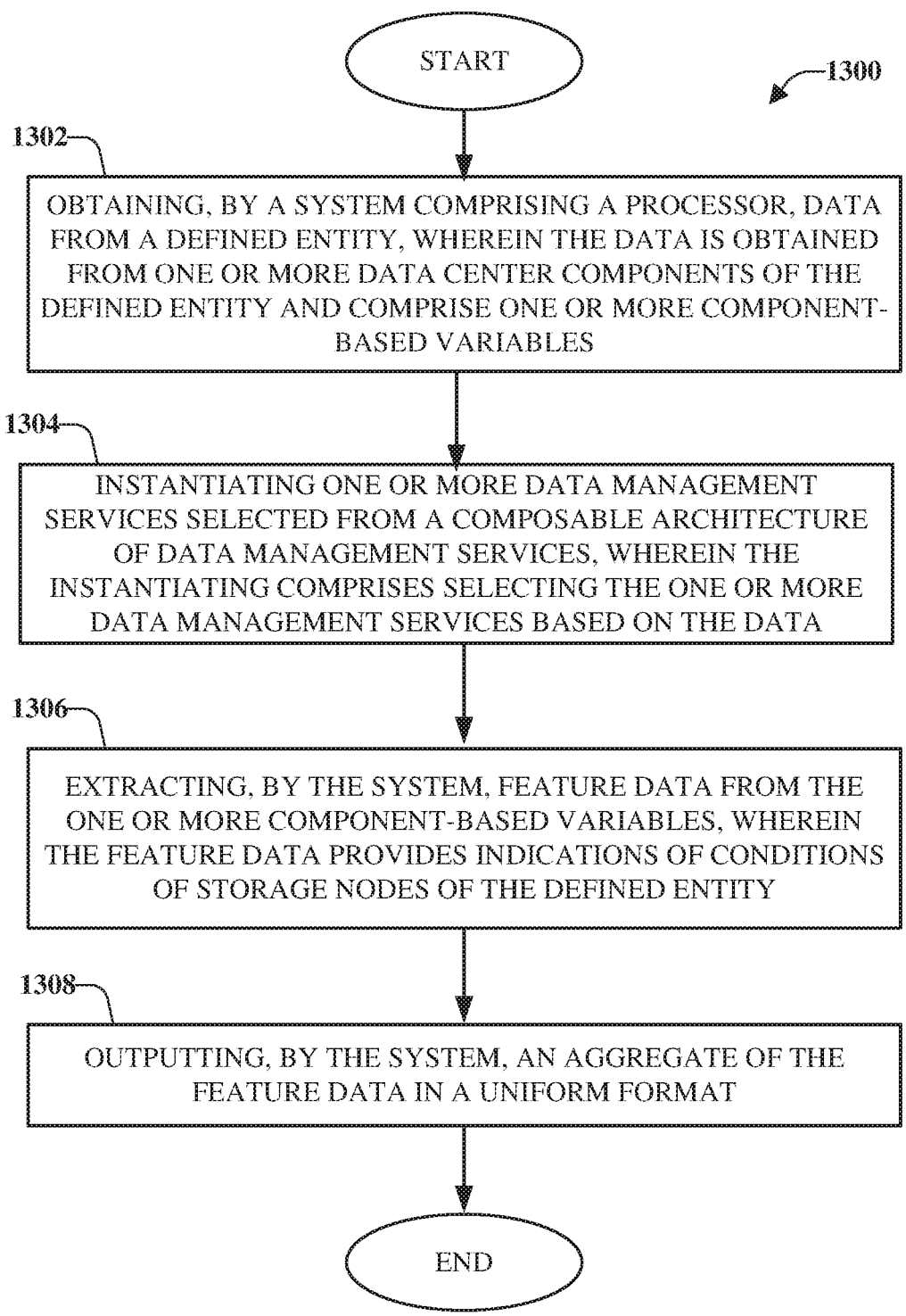
FIG. 13 illustrates a flow diagram of an example, non-limiting, computer-implemented method that facilitates feature engineering for temporal data management in accordance with one or more embodiments described herein.

FIG. 13 illustrates a flow diagram of an example, non-limiting, computer-implemented method 1300 that facilitates feature engineering for temporal data management in accordance with one or more embodiments described herein.

Repetitive description of like elements employed in other embodiments described herein is omitted for sake of brevity.

At 1302 of the computer-implemented method 1300 data can be obtained from a defined entity. The data can be obtained from one or more data center components of the defined entity and can comprise one or more component-based variables. One or more data management services selected from a composable architecture of data management services can be instantiated at 1304. Instantiating the cartridges can comprise selecting the one or more data management services based on the data.

Feature data can be extracted from the one or more component-based variables at 1306. The feature data can provide indications of conditions of storage nodes of the defined entity. An aggregate of the feature data can be output at 1308.

The extraction of the feature data can include generating the features. The generation of the features can include determining, at each time stamp of the second respective values of component-based variables, a mean value across data center components of the group of data center components. In another example, generating the features can include determining, at each time stamp of the second respective values of component-based variables, a standard deviation of values of data center components of the group of data center components. According to another example, generating the features can include determining, at each time stamp of the second respective values of component-based variables, a maximum deviation for a mean value of data center components of the group of data center components. In accordance with another example, generating the features can include determining, at each time stamp of the second respective values of component-based variables, an entropy of values of data center components of the group of data center components.

According to some implementations, the computer-implemented method 1300 can include determining a group of functions for the defined entity based on the second respective values of component-based variables. Further to these implementations, the computer-implemented method 1300 can include obtaining an overview of respective behaviors of similar components of the defined entity based on the group of functions being represented uniformly across functions of the group of functions.

As discussed, provided is an ETL process and data quality assessment for retrieving telemetry data from log files with minimum quality criteria. As discussed above, several log file formats could be used by data centers based, for example, on the type of computational resource (e.g., computing, network, and storage system). Therefore, performing the data access, parsing, tokenization, and extraction becomes a time-consuming and error-prone task when ad-hoc programs are used. An embodiment provides an ETL process as part of a temporal data management method that automates the copy of data from log files into a telemetry database by transforming the raw data appropriately. In addition, the disclosed aspects encompass a data quality assessment that considers a sequence of actions for (a) filtering only telemetry from data centers above a data quality threshold (e.g., a user-defined parameter), (b) removing telemetry data that are irrelevant for anomaly detection (because of data gaps in other data center components or variables, and/or (c) assessing temporal consistency when it is a constraint for the anomaly detection method.

Also provided herein is a feature engineering process in order to provide meaningful variables. The disclosed aspects use feature engineering techniques to create features derived from variables that, in their raw format, are not necessarily relevant for anomaly detection, but may contain valuable information. For example, component-based variables provided by storage systems or storage platforms can provide a precious indication of the health of each data center component. Nevertheless, it is difficult to use them in an anomaly detection method since each data center may present different configurations (e.g., number of components). Therefore, the disclosed aspects provide new features based on aggregate functions (e.g., mean, standard deviation, maximum deviation, entropy per node) that capture, in a uniform fashion, the behavior of all components at each timestamp.

As used herein, the term "storage device," "first storage device," "storage cluster nodes," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 14:
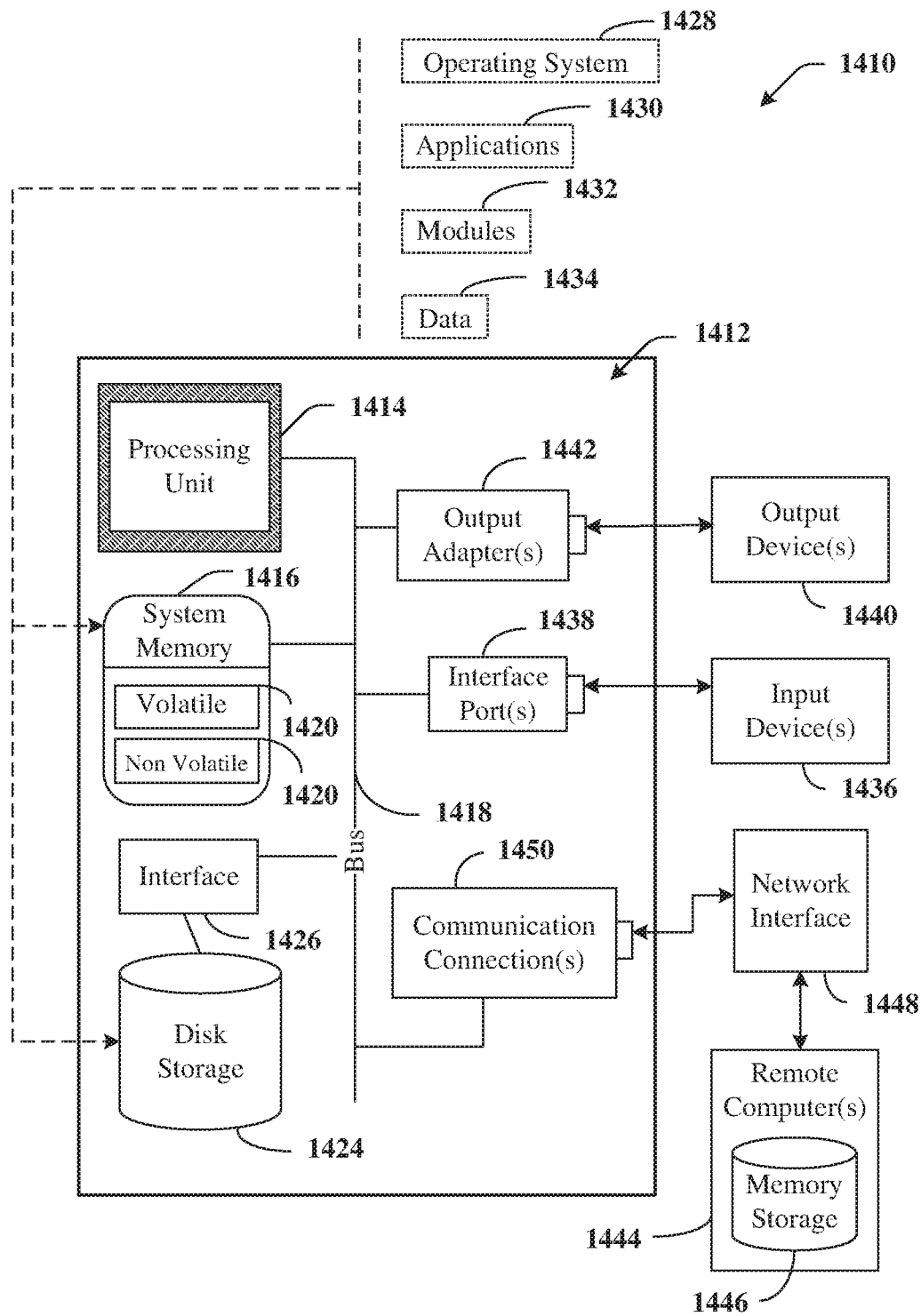
FIG. 14 illustrates an example, non-limiting, computing environment in which one or more embodiments described herein can be facilitated.

In order to provide a context for the various aspects of the disclosed subject matter, FIG. 14 as well as the following discussion are intended to provide a brief, general description of a suitable environment in which the various aspects of the disclosed subject matter can be implemented.

With reference to FIG. 14, an example environment 1410 for implementing various aspects of the aforementioned subject matter comprises a computer 1412. The computer 1412 comprises a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 comprises volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can comprise read only memory (ROM), programmable ROM (PROM), electrically programmable ROM (EPROM), electrically erasable PROM (EEPROM), or flash memory. Volatile memory 1420 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also comprises removable/non-removable, volatile/non-volatile computer storage media. FIG. 14 illustrates, for example a disk storage 1424. Disk storage 1424 comprises, but is not limited to, devices like a magnetic disk drive, floppy disk drive, tape drive, Jaz drive, Zip drive, LS-100 drive, flash memory card, or memory stick. In addition, disk storage 1424 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software comprises an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 comprise, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 comprise, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically comprises many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 comprises, for exemplary purposes only, internal and external technologies such as, modems including regular telephone grade modems, cable modems and DSL modems, ISDN adapters, and Ethernet cards.

Figure 15:
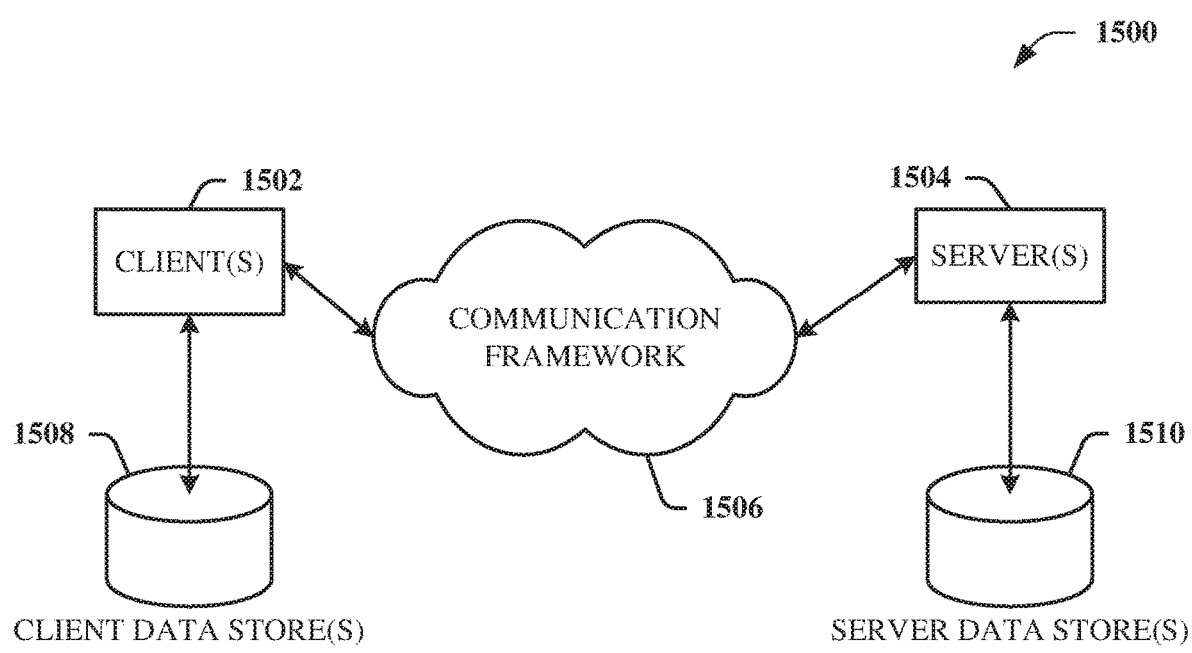
FIG. 15 illustrates an example, non-limiting, networking environment in which one or more embodiments described herein can be facilitated.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   instantiating, by a system comprising a processor, cartridges selected from a group of cartridges based on a defined file format of raw data received from log files associated with a defined entity, wherein the cartridges define respective conversion processes for the raw data;
   converting, by the system, the raw data into data representative of a time series, wherein the data comprises respective values of defined variables, and wherein the defined variables characterize elements of the defined entity;
   identifying a data gap within the data representative of the time series, resulting in identified data;
   removing the identified data from the data representative of the time series;
   determining, by the system, that a first set of variables of the defined variables satisfy a defined quality level, wherein the defined quality level is a temporal consistency of the first set of variables and a presence of a first defined variable of the first set of variables within the time series; and
   outputting, by the system, first time series data of the data representative of the time series, wherein the first time series data is for the first set of variables.

2. The method of claim 1, wherein the group of cartridges is a composable architecture of data management services.

3. The method of claim 1, further comprising:
   storing, by the system, the data representative of the time series in a data store.

4. The method of claim 3, further comprising:
   determining, by the system, that a second set of variables of the defined variables fail to satisfy the defined quality level; and
   removing, by the system, from the data store, second time series data of the data representative of the time series, wherein the second time series data is for the second set of variables.

5. The method of claim 1, further comprising:
   differentiating, by the system, the defined file format from a group of file formats based on respective variable types of the raw data.

6. The method of claim 1, further comprising:
   differentiating, by the system, the defined file format from a group of file formats based on respective granularities of telemetry data associated with the time series.

7. The method of claim 1, wherein the converting the raw data comprises:
   normalizing the raw data into a common data format, wherein the raw data is received from different elements of the defined entity.

8. The method of claim 1, wherein the raw data is first raw data, wherein the respective values are first respective values, and wherein the method further comprises:
   identifying, by the system, second raw data in the log files associated with the defined entity, wherein the second raw data comprises second respective values of component-based variables associated with a group of data center components of the defined entity;
   generating, by the system, features based on the second respective values of component-based variables; and
   outputting, by the system, the features as a uniform representation of the features.

9. The method of claim 8, wherein the generating the features comprises:
   determining, at each time stamp of the second respective values of component-based variables, a mean value across data center components of the group of data center components.

10. The method of claim 8, wherein the generating the features comprises:
    determining, at each time stamp of the second respective values of component-based variables, a standard deviation of values of data center components of the group of data center components.

11. The method of claim 8, wherein the generating the features comprises:
    determining, at each time stamp of the second respective values of component-based variables, a maximum deviation for a mean value of data center components of the group of data center components.

12. The method of claim 8, wherein the generating the features comprises:
    determining, at each time stamp of the second respective values of component-based variables, an entropy of values of data center components of the group of data center components.

13. The method of claim 1, wherein the cartridges of the group of cartridges are modular cartridges selected based on the log files under consideration.

14. A system, comprising:
    a processor; and
    a memory that stores executable instructions that, when executed by the processor, facilitate performance of operations, comprising:
        performing a process of extraction, transformation, and loading of data from log files into a telemetry data store, wherein the data is loaded into the telemetry data store as telemetry data, wherein the performing comprises instantiating cartridges of a group of cartridges, wherein the cartridges define respective conversion processes for the data;

dividing the telemetry data into first telemetry data and second telemetry data based on a defined quality level, wherein the defined quality level is a temporal consistency of the telemetry data and a presence of a defined variable within the telemetry data, wherein the first telemetry data comprises telemetry data that does not satisfy the defined quality level based on detection of a data gap in the first telemetry data and absence of the defined variable within the first telemetry data, and wherein the second telemetry data comprises telemetry data that satisfies the defined quality level based on the data gap not being detected in the second telemetry data and the defined variable being present within the second telemetry data;

removing the first telemetry data from the telemetry data store; and outputting the second telemetry data based on a request for the second telemetry data.

15. The system of claim 14, wherein the cartridges of the group of cartridges comprise a first cartridge and a second cartridge, and wherein the operations further comprise:

facilitating implementation of the first cartridge selected from the group of cartridges for first data of the telemetry data based on a first file format of the first data, wherein the first cartridge defines a first conversion process for the first data; and facilitating implementation of the second cartridge selected from the group of cartridges for second data of the telemetry data based on a second file format of the second data, wherein the second cartridge defines a second conversion process for the second data.

16. The system of claim 15, wherein the first cartridge and the second cartridge are modular cartridges.

17. The system of claim 15, wherein the first cartridge and the second cartridge are reusable cartridges.

18. The system of claim 14, wherein the data is first data, and wherein the operations further comprise:

determining second data of the log files comprise respective hidden data that represents component-based variables associated with nodes of a defined entity;

generating features based on the component-based variables, wherein the features are representative of a health of the defined entity; and outputting the features as a uniform representation.

19. A machine-readable storage medium, comprising executable instructions that, when executed by a processor, facilitate performance of operations, comprising:

obtaining data from a defined entity, wherein the data is obtained from one or more data center components of the defined entity and comprise one or more component-based variables;

instantiating one or more data management services selected from a composable architecture of data management services, wherein the instantiating comprises selecting the one or more data management services based on the data;

dividing the data into first data and second data, wherein the first data comprises a data gap resulting from lack of a temporal consistency of data from at least one data center component of the one or more data center components and lack of at least one component-based variable from the one or more component-based variables;

removing the first data from consideration;

extracting feature data from the one or more component-based variables of the second data, wherein the feature data provides indications of conditions of storage nodes of the defined entity; and outputting an aggregate of the feature data in a uniform format.

20. The machine-readable storage medium of claim 19, wherein the operations further comprise:

determining a group of functions for the defined entity based on the second respective values of component-based variables; and obtaining an overview of respective behaviors of similar components of the defined entity based on the group of functions being represented uniformly across functions of the group of functions.

* * * * *